United States Patent
Ghaznavi Youvalari et al.

(10) Patent No.: US 12,542,931 B2
(45) Date of Patent: Feb. 3, 2026

(54) PERFORMANCE IMPROVEMENTS OF MACHINE VISION TASKS VIA LEARNED NEURAL NETWORK BASED FILTER

(71) Applicant: Nokia Technologies Oy, Espoo (FI)

(72) Inventors: Ramin Ghaznavi Youvalari, Tampere (FI); Honglei Zhang, Tampere (FI); Francesco Cricrì, Tampere (FI); Nam Hai Le, Tampere (FI); Miska Matias Hannuksela, Tampere (FI); Hamed Rezazadegan Tavakoli, Espoo (FI); Jukka Ilari Ahonen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 112 days.

(21) Appl. No.: 18/577,010

(22) PCT Filed: Jun. 21, 2022

(86) PCT No.: PCT/EP2022/066777
§ 371 (c)(1),
(2) Date: Jan. 5, 2024

(87) PCT Pub. No.: WO2023/280558
PCT Pub. Date: Jan. 12, 2023

(65) Prior Publication Data
US 2024/0314362 A1    Sep. 19, 2024

Related U.S. Application Data

(60) Provisional application No. 63/218,646, filed on Jul. 6, 2021.

(51) Int. Cl.
*H04N 19/82* (2014.01)
*H04N 19/119* (2014.01)
(Continued)

(52) U.S. Cl.
CPC ........... *H04N 19/82* (2014.11); *H04N 19/119* (2014.11); *H04N 19/139* (2014.11); *H04N 19/70* (2014.11); *H04N 19/85* (2014.11)

(58) Field of Classification Search
CPC .... H04N 19/82; H04N 19/119; H04N 19/139; H04N 19/70; H04N 19/85
See application file for complete search history.

(56) References Cited

U.S. PATENT DOCUMENTS 10,708,624 B1 * 7/2020 Saeedi .................. H04N 19/50
11,562,551 B1 * 1/2023 Oertel .................. G06K 7/1413
(Continued)

FOREIGN PATENT DOCUMENTS

| CN | 105824021 A | 8/2016 |
| CN | 111194555 A | 8/2018 |

(Continued)

OTHER PUBLICATIONS

Zhu, Han translation of CN 113259671 Feb. 10, 2020 (Year: 2020).*
(Continued)

*Primary Examiner* — Zaihan Jiang
(74) *Attorney, Agent, or Firm* — McCarter & English, LLP; Joseph C. Drish

(57) ABSTRACT

A method includes receiving auxiliary information and/or at least one auxiliary feature, the at least one auxiliary feature being based on the auxiliary information; wherein the auxiliary information comprises information available within a decoder, or the auxiliary information comprises a bitstream output from data encoded using an encoder; receiving decoded data generated using the decoder; and generating filtered data with at least one filter using the auxiliary information and/or the at least one auxiliary feature via applying the filter to the decoded data; wherein the at least one filter comprises a learned filter; wherein the filtered data (Continued)

is configured to be used for at least one machine task performed using a model.

20 Claims, 16 Drawing Sheets

(51) Int. Cl.
    *H04N 19/139*     (2014.01)
    *H04N 19/70*     (2014.01)
    *H04N 19/85*     (2014.01)

(56) References Cited

U.S. PATENT DOCUMENTS

| | | | |
|---|---|---|---|
| 2013/0243046 A1* | 9/2013 | Vetterli | H04L 25/0204 375/267 |
| 2019/0361719 A1 | 11/2019 | Vangala et al. | |
| 2021/0081830 A1* | 3/2021 | Rees | G06N 3/09 |
| 2021/0157911 A1* | 5/2021 | Yu | G06N 3/0455 |
| 2021/0275908 A1* | 9/2021 | Amer | G06T 7/215 |
| 2022/0067618 A1* | 3/2022 | Goli | G06F 18/2155 |
| 2023/0018461 A1* | 1/2023 | Bourdev | G06N 20/00 |
| 2023/0344974 A1* | 10/2023 | Li | H04N 13/232 |
| 2024/0137506 A1* | 4/2024 | Zhang | G06T 3/40 |
| 2024/0244226 A1* | 7/2024 | Li | H04N 19/154 |
| 2024/0244239 A1* | 7/2024 | Li | H04N 19/176 |
| 2024/0378863 A1* | 11/2024 | Marri | G06V 10/774 |

FOREIGN PATENT DOCUMENTS

| | | | |
|---|---|---|---|
| CN | 113259671 | * | 2/2020 |
| WO | WO-2015076634 | * | 11/2014 |
| WO | 2019194425 A1 | | 10/2019 |

OTHER PUBLICATIONS

"Video Coding For Low Bit Rate Communication", Series H: Audiovisual And Multimedia Systems, Infrastructure of audiovisual services—Coding of moving Video, ITU-T Recommendation H.263, Jan. 2005, 226 pages.
"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.
"High Efficiency Video Coding", Series H: Audiovisual And Multimedia Systems, Infrastructure of audiovisual services—Coding of moving video, Recommendation ITU-T H.265, Feb. 2018, 692 pages.
"Versatile Video Coding", Series H: Audiovisual and Multimedia Systems Infrastructure of audiovisual services—Coding of moving video, Recommendation ITU-T H.266, Aug. 2020, 516 pages.
"Versatile supplemental enhancement information messages for coded video bitstreams", Series H: Audiovisual and Multimedia Systems Infrastructure of audiovisual services—Coding of moving video, Recommendation ITU-T H.274, Aug. 2020, 86 pages.
Chen et al., "Algorithm description for Versatile Video Coding and Test Model 10 (VTM 10)", Editors, Joint Video Experts Team (JVET) of ITU-T SG 16 WP 3 and ISO/IEC JTC 1/SC 29/WG 11, Document: JVET-S2002-v1, 19th Meeting, Jun. 22-Jul. 1, 2020, 99 pages.
"IEEE 802.11", Wikipedia, Retrieved on Feb. 26, 2024, Webpage available at : https://en.wikipedia.org/wiki/IEEE_802.11.
"Information Technology—Generic Coding of Moving Pictures and Associated Audio Information: Systems", Series H: Audiovisual and Multimedia Systems, Infrastructure of Audiovisual Services—Transmission Multiplexing and Synchronization, Recommendation ITU-T H.222.0, Mar. 2017, 291 pages.
"Information Technology - Coding Of Audio-Visual Objects - Part 12: ISO Base Media File Format", ISO/IEC 14496-12, Fifth edition, Dec. 15, 2015, 248 pages.
"Information Technology—Coding Of Audio-Visual Objects—Part 15: Advanced Video Coding (AVC) File Format", ISO/IEC 14496-15, First edition, Apr. 15, 2004, 29 pages.
"Information technology—Generic coding of moving pictures and associated audio information: Video", Series H: Audiovisual and Multimedia Systems Infrastructure of audiovisual services—Coding of moving video, ITU-T Recommendation H.262, Feb. 2000, 220 pages.
International Search Report and Written Opinion received for corresponding Patent Cooperation Treaty Application No. PCT/EP2022/066777, dated Oct. 12, 2022, 17 pages.
Choi et al., "AHG9/AHG11: SEI messages for carriage of neural network information for postfiltering", Tencent, Joint Video Experts Team (JVET) of ITU-T SG 16 WP 3 and ISO/IEC JTC 1/SC 29, Document: JVET-V0091-v2, 22nd Meeting, Apr. 20-28, 2021, 15 pages.
Ahonen et al., "Learned Enhancement Filters for Image Coding for Machines", IEEE International Symposium on Multimedia (ISM), Nov. 29-Dec. 1, 2021, pp. 235-239.
Ahonen, "Image Coding for Machines—Deep learning based post-processing filters", Master's Thesis, Nov. 2021, 54 pages.
Li et al., "CNN based post-processing to improve HEVC", IEEE International Conference on Image Processing (ICIP), Sep. 17-20, 2017, pp. 4577-4580.
Wang et al., "Joint Learned and Traditional Video Compression for P Frame", IEEE/CVF Conference on Computer Vision and Pattern Recognition Workshops (CVPRW), Jun. 14-19, 2020, pp. 560-564.

* cited by examiner

PERFORMANCE IMPROVEMENTS OF MACHINE VISION TASKS VIA LEARNED NEURAL NETWORK BASED FILTER

RELATED APPLICATION

This application was originally filed as PCT Application No. PCT/EP2022/066777, filed on Jun. 21, 2022, which claims priority from U.S. Provisional Application No. 63/218,646, filed on Jul. 6, 2021, each of which is incorporated herein by reference in its entirety.

The project leading to this application has received funding from the ECSEL Joint Undertaking (JU) under grant agreement No 783162. The JU receives support from the European Union's Horizon 2020 research and innovation programme and Netherlands, Czech Republic, Finland, Spain, Italy. The project leading to this application has received funding from the ECSEL Joint Undertaking (JU) under grant agreement No 876019. The JU receives support from the European Union's Horizon 2020 research and innovation programme and Germany, Netherlands, Austria, Romania, France, Sweden, Cyprus, Greece, Lithuania, Portugal, Italy, Finland, Turkey.

TECHNICAL FIELD

The examples and non-limiting embodiments relate generally to multimedia transport and machine learning and, more particularly, to performance improvements of machine vision tasks via learned neural network based filter.

BACKGROUND

It is known to perform data compression and decoding in a multimedia system.

BRIEF DESCRIPTION OF THE DRAWINGS

The foregoing aspects and other features are explained in the following description, taken in connection with the accompanying drawings, wherein.

DETAILED DESCRIPTION OF EXAMPLE EMBODIMENTS

Described herein are methods for improving task NN performance by using a post-processing filter which is trained on auxiliary information, which auxiliary information may be obtained from traditional codecs.

Figure 1:
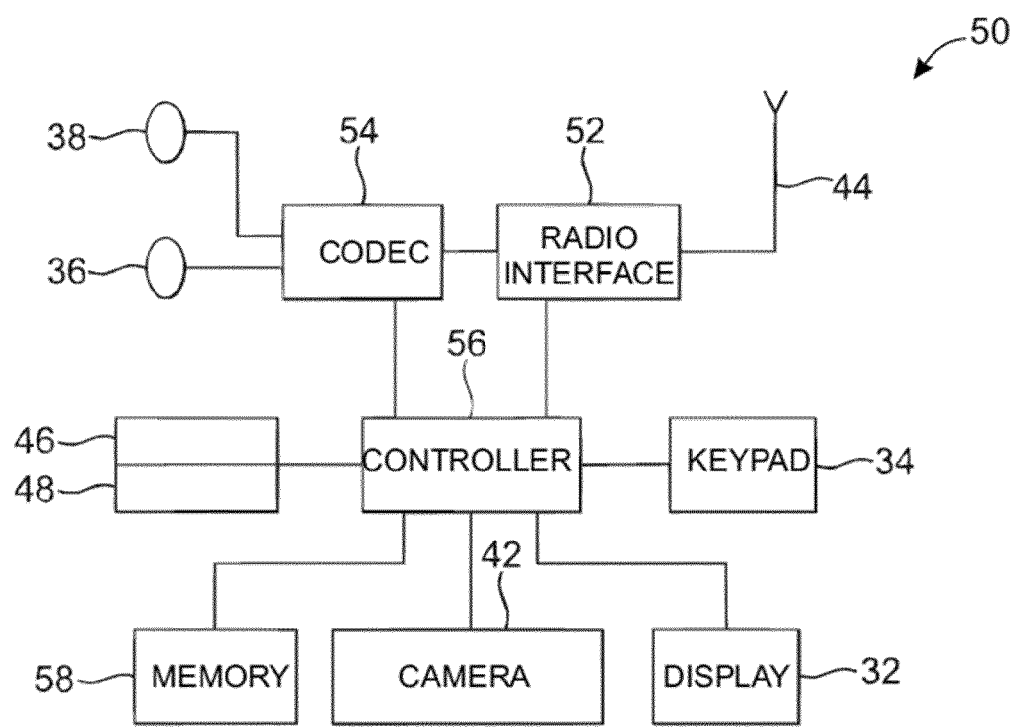
FIG. 1 shows schematically an electronic device employing embodiments of the examples described herein.
Figure 2:
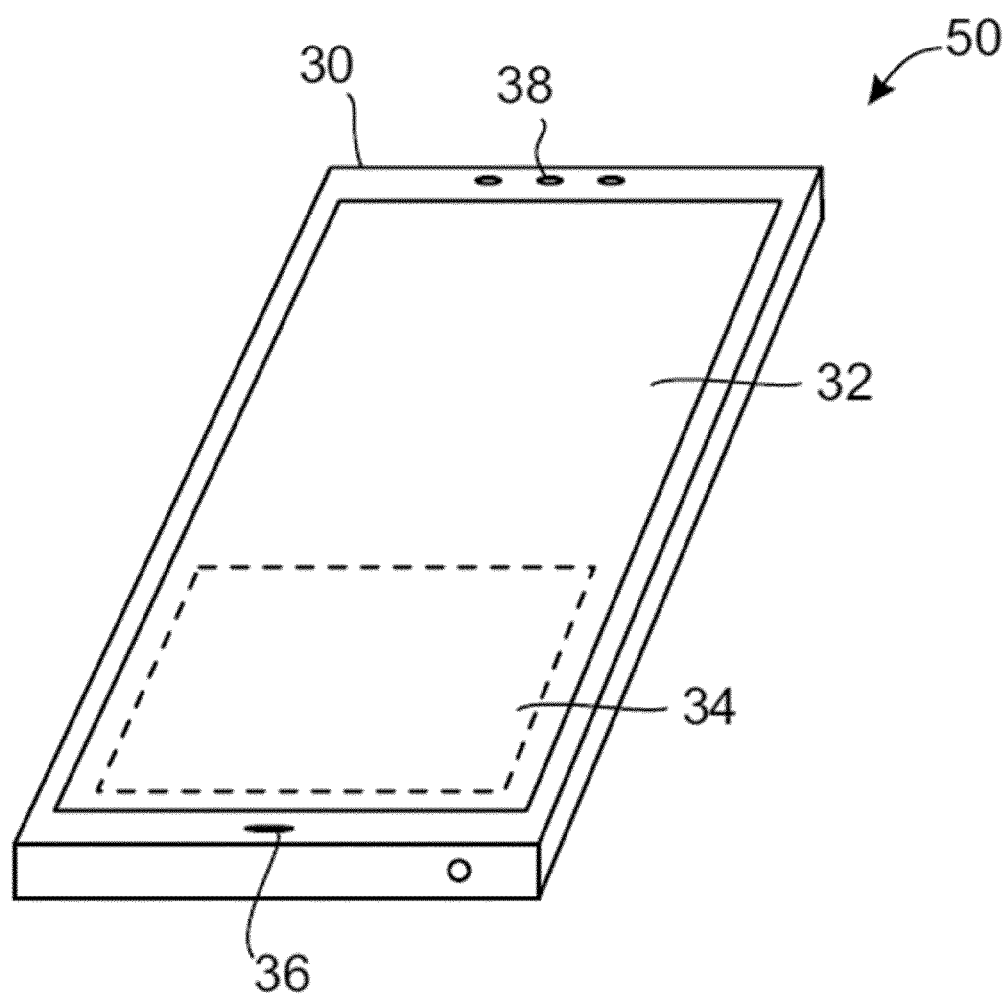
FIG. 2 shows schematically a user equipment suitable for employing embodiments of the examples described herein.

The following describes in detail a suitable apparatus and possible mechanisms for a video/image encoding process according to embodiments. In this regard reference is first made to FIG. 1 and FIG. 2, where FIG. 1 shows an example block diagram of an apparatus 50. The apparatus may be an Internet of Things (IoT) apparatus configured to perform various functions, such as for example, gathering information by one or more sensors, receiving or transmitting information, analyzing information gathered or received by the apparatus, or the like. The apparatus may comprise a video coding system, which may incorporate a codec. FIG. 2 shows a layout of an apparatus according to an example embodiment. The elements of FIG. 1 and FIG. 2 are explained next.

The electronic device 50 may for example be a mobile terminal or user equipment of a wireless communication system, a sensor device, a tag, or other lower power device. However, it would be appreciated that embodiments of the examples described herein may be implemented within any electronic device or apparatus which may process data by neural networks.

The apparatus 50 may comprise a housing 30 for incorporating and protecting the device. The apparatus 50 further may comprise a display 32 in the form of a liquid crystal display. In other embodiments of the examples described herein the display may be any suitable display technology suitable to display an image or video. The apparatus 50 may further comprise a keypad 34. In other embodiments of the examples described herein any suitable data or user interface mechanism may be employed. For example the user interface may be implemented as a virtual keyboard or data entry system as part of a touch-sensitive display.

The apparatus may comprise a microphone 36 or any suitable audio input which may be a digital or analog signal input. The apparatus 50 may further comprise an audio output device which in embodiments of the examples described herein may be any one of: an earpiece 38, speaker, or an analog audio or digital audio output connection. The apparatus 50 may also comprise a battery (or in other embodiments of the examples described herein the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the examples described herein may store both data in the form of image and audio data and/or may also store instructions for implementation on the controller 56. The controller 56 may further be connected to codec circuitry 54 suitable for carrying out coding and/or decoding of audio and/or video data or assisting in coding and/or decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication communications with a cellular a wireless network, communications system or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
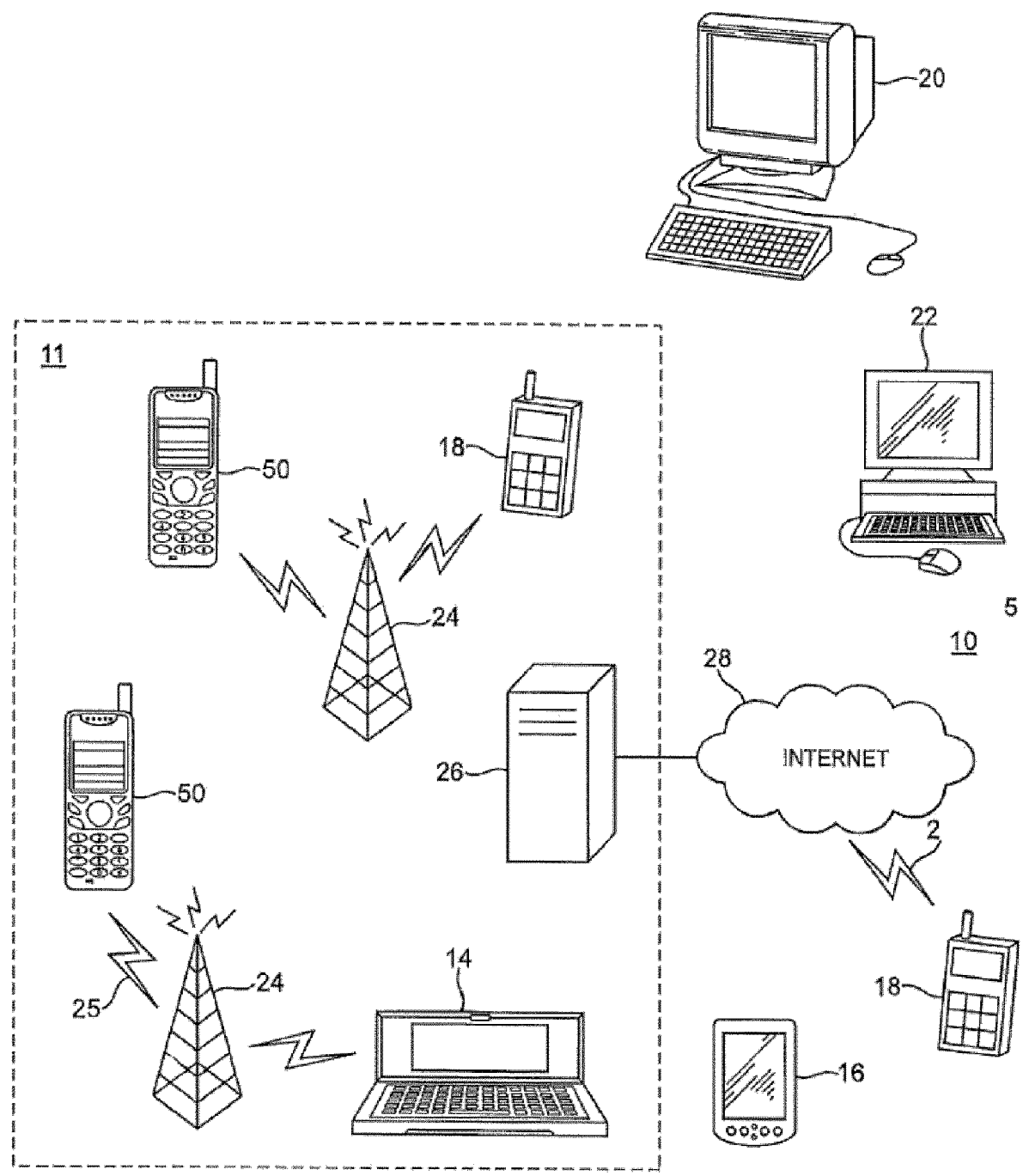
FIG. 3 further shows schematically electronic devices employing embodiments of the examples described herein connected using wireless and wired network connections.

With respect to FIG. 3, an example of a system within which embodiments of the examples described herein can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA, LTE, 4G, 5G network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the examples described herein.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware and/or software to process neural network data, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, 3GPP Narrowband IoT and any similar wireless communication technology. A communications device involved in implementing various embodiments of the examples described herein may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

The embodiments may also be implemented in so-called IoT devices. The Internet of Things (IoT) may be defined, for example, as an interconnection of uniquely identifiable embedded computing devices within the existing Internet infrastructure. The convergence of various technologies has and may enable many fields of embedded systems, such as wireless sensor networks, control systems, home/building automation, etc. to be included in the Internet of Things (IoT). In order to utilize the Internet IoT devices are provided with an IP address as a unique identifier. IoT devices may be provided with a radio transmitter, such as a WLAN or Bluetooth transmitter or a RFID tag. Alternatively, IoT devices may have access to an IP-based network via a wired network, such as an Ethernet-based network or a power-line connection (PLC).

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

A video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typical encoders discard some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures, or reference frames). In intra block copy (IBC; a.k.a. intra-block-copy prediction and current picture referencing), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process as temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in the spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
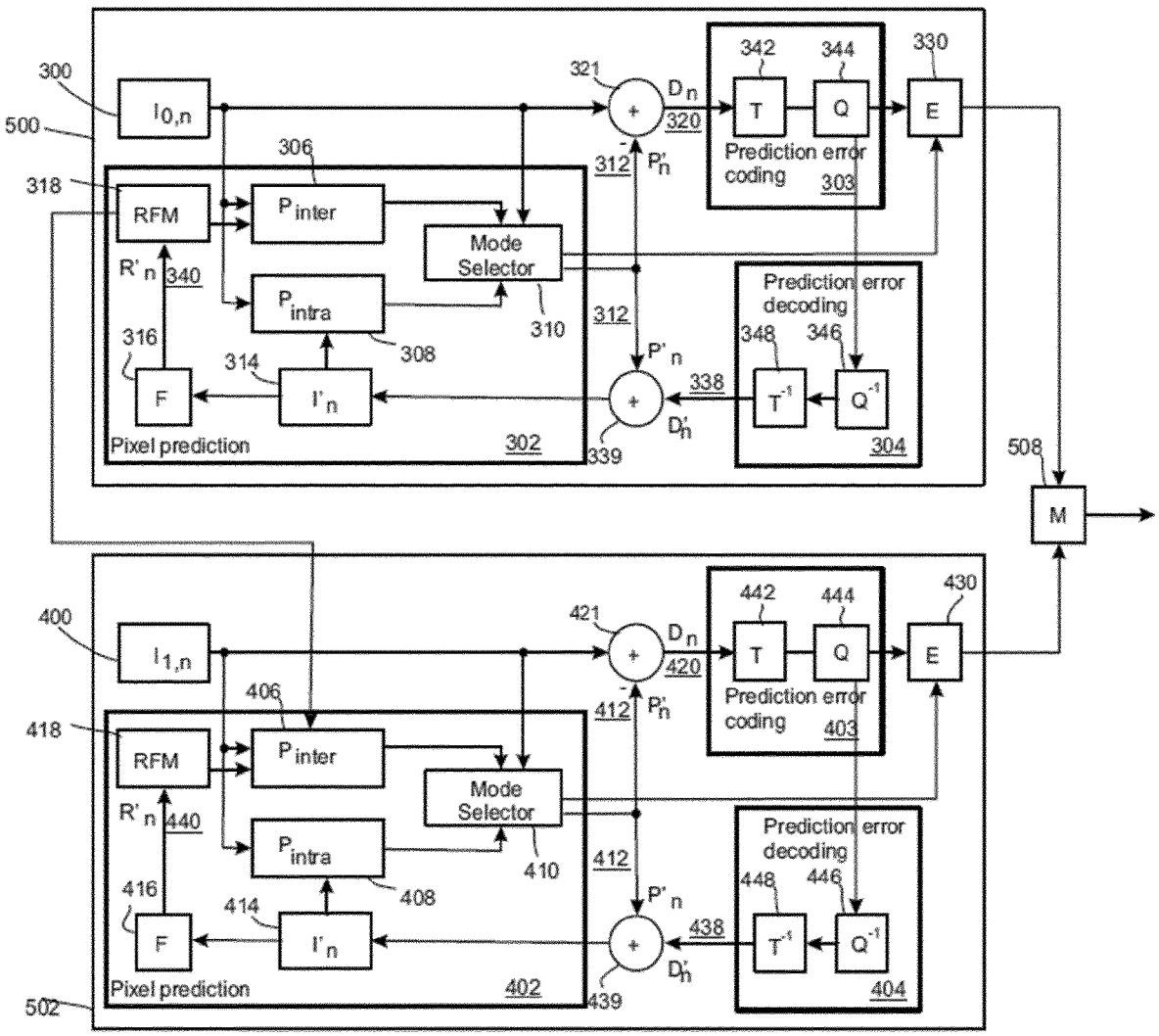
FIG. 4 shows schematically a block chart of an encoder used for data compression on a general level.

FIG. 4 shows a block diagram of a general structure of a video encoder. FIG. 4 presents an encoder for two layers, but it would be appreciated that presented encoder could be similarly extended to encode more than two layers. FIG. 4 illustrates a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406 ($P_{inter}$), an intra-predictor 308, 408 ($P_{intra}$), a mode selector 310, 410, a filter 316, 416 (F), and a reference frame memory 318, 418 (RFM). The pixel predictor 302 of the first encoder section 500 receives 300 base layer images ($I_{0,n}$) of a video stream to be encoded at both the inter-predictor 306 (which determines the difference between the image and a motion compensated reference frame 318) and the intra-predictor 308 (which determines a prediction for an image block based only on the already processed parts of the current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images ($I_{1,n}$) of a video stream to be encoded at both the inter-predictor 406 (which determines the difference between the image and a motion compensated reference frame 418) and the intra-predictor 408 (which determines a prediction for an image block based only on the already processed parts of the current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 ($D_n$) which is input to the prediction error encoder 303, 403.

The pixel predictor 302, 402 further receives from a preliminary reconstructor 339, 439 the combination of the prediction representation of the image block 312, 412 ($P'_n$)

and the output 338, 438 ($D'_n$) of the prediction error decoder 304, 404. The preliminary reconstructed image 314, 414 ($I'_n$) may be passed to the intra-predictor 308, 408 and to the filter 316, 416. The filter 316, 416 receiving the preliminary representation may filter the preliminary representation and output a final reconstructed image 340, 440 ($R'_n$) which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be the source for inter-layer sample prediction and/or inter-layer motion information prediction of the enhancement layer according to some embodiments, the reference frame memory 318 may also be connected to the inter-predictor 406 to be used as the reference image against which a future enhancement layer picture 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be the source for predicting the filtering parameters of the enhancement layer according to some embodiments.

The prediction error encoder 303, 403 comprises a transform unit 342, 442 (T) and a quantizer 344, 444 (Q). The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder 304, 404 may be considered to comprise a dequantizer 346, 446 ($Q^{-1}$), which dequantizes the quantized coefficient values, e.g. DCT coefficients, to reconstruct the transform signal and an inverse transformation unit 348, 448 ($T^{-1}$), which performs the inverse transformation to the reconstructed transform signal wherein the output of the inverse transformation unit 348, 448 contains reconstructed block (s). The prediction error decoder may also comprise a block filter which may filter the reconstructed block (s) according to further decoded information and filter parameters.

The entropy encoder 330, 430 (E) receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508 (M).

Fundamentals of Neural Networks

A neural network (NN) is a computation graph consisting of several layers of computation. Each layer consists of one or more units, where each unit performs an elementary computation. A unit is connected to one or more other units, and the connection may have associated with a weight. The weight may be used for scaling the signal passing through the associated connection. Weights are learnable parameters, i.e., values which can be learned from training data. There may be other learnable parameters, such as those of batch-normalization layers.

Two of the most widely used architectures for neural networks are feed-forward and recurrent architectures. Feed-forward neural networks are such that there is no feedback loop: each layer takes input from one or more of the layers before and provides its output as the input for one or more of the subsequent layers. Also, units inside a certain layer take input from units in one or more of preceding layers, and provide output to one or more of following layers.

Initial layers (those close to the input data) extract semantically low-level features such as edges and textures in images, and intermediate and final layers extract more high-level features. After the feature extraction layers there may be one or more layers performing a certain task, such as classification, semantic segmentation, object detection, denoising, style transfer, super-resolution, etc. In recurrent neural nets, there is a feedback loop, so that the network becomes stateful, i.e., it is able to memorize information or a state.

Neural networks are being utilized in an ever-increasing number of applications for many different types of device, such as mobile phones. Examples include image and video analysis and processing, social media data analysis, device usage data analysis, etc.

One of the properties of neural nets (and other machine learning tools) is that they are able to learn properties from input data, either in supervised way or in unsupervised way. Such learning is a result of a training algorithm, or of a meta-level neural network providing the training signal.

In general, the training algorithm consists of changing some properties of the neural network so that its output is as close as possible to a desired output. For example, in the case of classification of objects in images, the output of the neural network can be used to derive a class or category index which indicates the class or category that the object in the input image belongs to. Training usually happens by minimizing or decreasing the output's error, also referred to as the loss. Examples of losses are mean squared error, cross-entropy, etc. In recent deep learning techniques, training is an iterative process, where at each iteration the algorithm modifies the weights of the neural net to make a gradual improvement of the network's output, i.e., to gradually decrease the loss.

The examples described herein use the terms "model", "neural network", "neural net" and "network" interchangeably, and also the weights of neural networks are sometimes referred to as learnable parameters or simply as parameters.

Training a neural network is an optimization process, but the final goal is different from the typical goal of optimization. In optimization, the only goal is to minimize a function. In machine learning, the goal of the optimization or training process is to make the model learn the properties of the data distribution from a limited training dataset. In other words, the goal is to learn to use a limited training dataset in order to learn to generalize to previously unseen data, i.e., data which was not used for training the model. This is usually referred to as generalization. In practice, data is usually split into at least two sets, the training set and the validation set. The training set is used for training the network, i.e., to modify its learnable parameters in order to minimize the loss. The validation set is used for checking the performance of the network on data which was not used to minimize the loss, as an indication of the final performance of the model. In particular, the errors on the training set and on the validation set are monitored during the training process to understand the following things (1-2):

1. If the network is learning at all—in this case, the training set error should decrease, otherwise the model is in the regime of underfitting.

2. If the network is learning to generalize—in this case, also the validation set error needs to decrease and to be not too much higher than the training set error. If the training set error is low, but the validation set error is much higher than the training set error, or it does not decrease, or it even increases, the model is in the regime of overfitting. This means that the model has just memorized the training set's properties and performs well only on that set, but performs poorly on a set not used for tuning its parameters.

Lately, neural networks have been used for compressing and de-compressing data such as images, i.e., in an image codec. The most widely used architecture for realizing one component of an image codec is the auto-encoder, which is a neural network consisting of two parts: a neural encoder and a neural decoder (in this description these are referred to simply as encoder and decoder, even though the description herein may refer to algorithms which are learned from data instead of being tuned by hand). The encoder takes as input an image and produces a code which requires less bits than the input image. This code may be obtained by applying a binarization or quantization process to the output of the encoder. The decoder takes in this code and reconstructs the image which was input to the encoder.

Such encoder and decoder are usually trained to minimize a combination of bitrate and distortion, where the distortion may be based on one or more of the following metrics: Mean Squared Error (MSE), Peak Signal-to-Noise Ratio (PSNR), Structural Similarity Index Measure (SSIM), or similar. These distortion metrics are meant to be correlated to the human visual perception quality, so that minimizing or maximizing one or more of these distortion metrics results into improving the visual quality of the decoded image as perceived by humans.

Fundamentals of Video/Image Coding

Video codec consists of an encoder that transforms the input video into a compressed representation suited for storage/transmission and a decoder that can decompress the compressed video representation back into a viewable form. Typically encoder discards some information in the original video sequence in order to represent the video in a more compact form (that is, at lower bitrate).

Typical hybrid video codecs, for example ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

Inter prediction, which may also be referred to as temporal prediction, motion compensation, or motion-compensated prediction, exploits temporal redundancy. In inter prediction the sources of prediction are previously decoded pictures.

Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

In typical video codecs the motion information is indicated with motion vectors associated with each motion compensated image block. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of previously coded/decoded picture can be predicted. The reference index is typically predicted from adjacent blocks and/or or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired Macroblock mode and associated motion vectors. This kind of cost function uses a weighting factor λ to tie together the (exact or estimated) image distortion due to lossy coding methods and the (exact or estimated) amount of information that is required to represent the pixel values in an image area:

$$C = D + \lambda R$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding specifications may enable the use of supplemental enhancement information (SEI) messages or alike. Some video coding specifications include SEI NAL units, and some video coding specifications contain both prefix SEI NAL units and suffix SEI NAL units, where the former type can start a picture unit or alike and the latter type can end a picture unit or alike. An SEI NAL unit contains one or more SEI messages, which are not required for the decoding of output pictures but may assist in related processes, such as picture output timing, post-processing of decoded pictures, rendering, error detection, error concealment, and resource reservation. Several SEI messages are specified in H.264/AVC, H.265/HEVC, H.266/VVC, and H.274/VSEI standards, and the user data SEI messages enable organizations and companies to specify SEI messages for their own use. The standards may contain the syntax and semantics for the specified SEI messages but a process for handling the messages in the recipient might not be defined. Consequently, encoders may be required to follow the standard specifying a SEI message when they create SEI message (s), and decoders might not be required to process SEI messages for output order conformance. One of the reasons to include the syntax and semantics of SEI messages in standards is allow to different system specifications to interpret the supplemental information identically and hence interoperate. It is intended that system specifications can require the use of particular SEI messages both in the encoding end and in the decoding end, and additionally the process for handling particular SEI messages in the recipient can be specified.

A design principle has been followed for SEI message specifications: the SEI messages are generally not extended in future amendments or versions of the standard.

Details on coding tools of VVC/H.266 are described in document JVET-S2002.

Background on Filters in Video Codecs

Conventional image and video codecs use a set of filters to enhance the visual quality of the predicted visual content and can be applied either in-loop or out-of-loop, or both. In the case of in-loop filters, the filter applied on one block in the currently-encoded frame affects the encoding of another block in the same frame and/or in another frame which is predicted from the current frame. An in-loop filter can affect the bitrate and/or the visual quality. In fact, an enhanced block causes a smaller residual (difference between original block and predicted-and-filtered block), thus requiring less bits to be encoded. An out-of-the loop filter is applied on a frame after it has been reconstructed, the filtered visual content won't be as a source for prediction, and thus it may only impact the visual quality of the frames that are output by the decoder.

Background Information on Neural Network Based Image/Video Coding

Recently, neural networks (NNs) have been used in the context of image and video compression, by following mainly two approaches.

In one approach, NNs are used to replace one or more of the components of a traditional codec such as VVC/H.266. Here, "traditional" means those codecs whose components and their parameters are typically not learned from data. Examples of such components are:

Additional in-loop filter, for example by having the NN as an additional in-loop filter with respect to the traditional loop filters.

Single in-loop filter, for example by having the NN replacing all traditional in-loop filters.

Intra-frame prediction.

Inter-frame prediction.

Transform and/or inverse transform.

Probability model for the arithmetic codec.

Etc.

Figure 5:
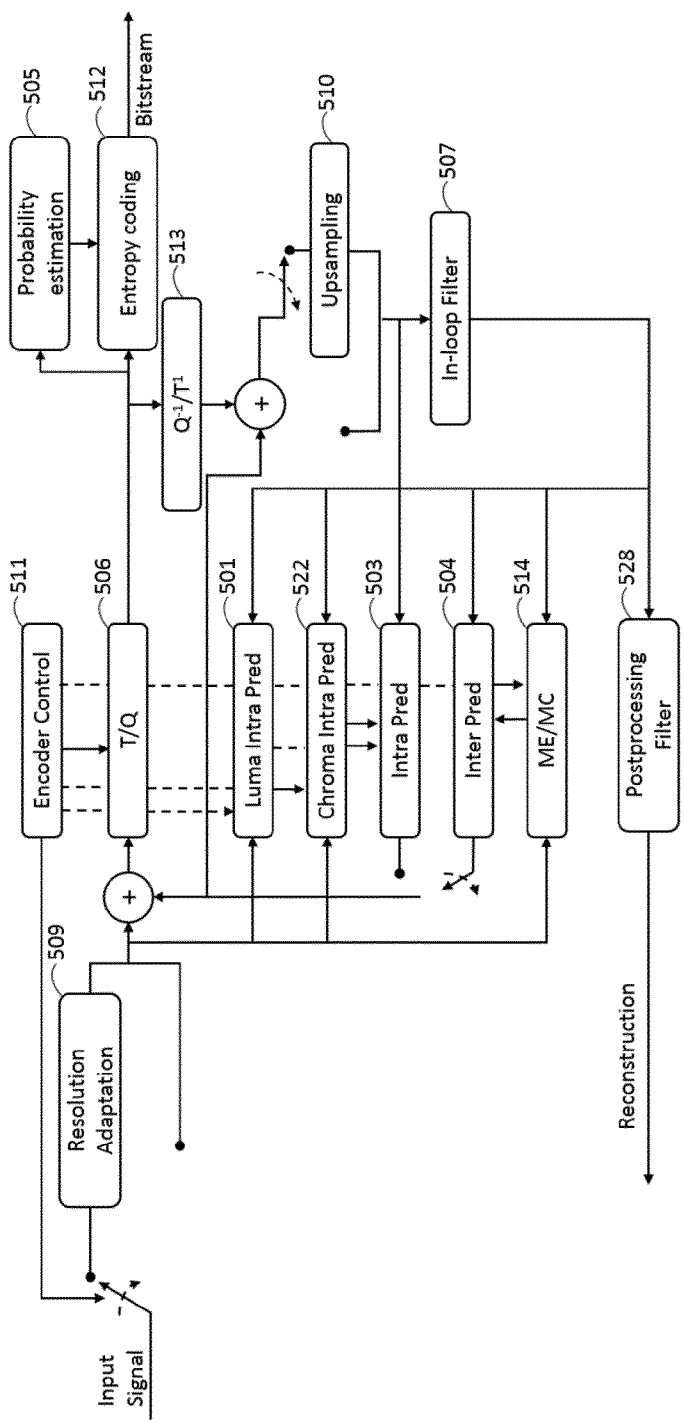
FIG. 5 illustrates examples of how neural networks can function as components of a traditional codec's pipeline.

FIG. 5 illustrates examples of functioning of NNs as components of a traditional codec's pipeline, in accordance with an embodiment. In particular, FIG. 5 illustrates an encoder, which also includes a decoding loop. FIG. 5 is shown to include components described below:

A luma intra pred block or circuit 501. This block or circuit performs intra prediction in the luma domain, for example, by using already reconstructed data from the same frame. The operation of the luma intra pred block or circuit 501 may be performed by a deep neural network such as a convolutional auto-encoder.

A chroma intra pred block or circuit 522. This block or circuit performs intra prediction in the chroma domain, for example, by using already reconstructed data from the same frame. The chroma intra pred block or circuit 522 may perform cross-component prediction, for example, predicting chroma from luma. The operation of the chroma intra pred block or circuit 522 may be performed by a deep neural network such as a convolutional auto-encoder.

An intra pred block or circuit 503 and inter-pred block or circuit 504. These blocks or circuit perform intra prediction and inter-prediction, respectively. The intra pred block or circuit 503 and the inter-pred block or circuit 504 may perform the prediction on all components, for example, luma and chroma. The operations of the intra pred block or circuit 503 and inter-pred block or circuit 504 may be performed by two or more deep neural networks such as convolutional auto-encoders.

A probability estimation block or circuit 505 for entropy coding. This block or circuit performs prediction of probability for the next symbol to encode or decode, which is then provided to the entropy coding module 512, such as the arithmetic coding module, to encode or decode the next symbol. The operation of the probability estimation block or circuit 505 may be performed by a neural network.

A transform and quantization (T/Q) block or circuit 506. These are actually two blocks or circuits. The transform and quantization block or circuit 506 may perform a transform of input data to a different domain, for example, the FFT transform would transform the data to frequency domain. The transform and quantization block or circuit 506 may quantize its input values to a smaller set of possible values. In the decoding loop, there may be inverse quantization block or circuit and inverse transform block or circuit 513. One or both of the transform block or circuit and quantization block or circuit may be replaced by one or two or more neural networks. One or both of the inverse transform block or circuit and inverse quantization block or circuit 513 may be replaced by one or two or more neural networks.

An in-loop filter block or circuit 507. Operations of the in-loop filter block or circuit 507 is performed in the decoding loop, and it performs filtering on the output of the inverse transform block or circuit, or anyway on the reconstructed data, in order to enhance the reconstructed data with respect to one or more predetermined quality metrics. This filter may affect both the quality of the decoded data and the bitrate of the bitstream output by the encoder. The operation of the in-loop filter block or circuit 507 may be performed by a neural network, such as a convolutional auto-encoder. In examples, the operation of the in-loop filter may be performed by multiple steps or filters, where the one or more steps may be performed by neural networks.

A post-processing filter block or circuit 528. The post-processing filter block or circuit 528 may be performed only at decoder side, as it may not affect the encoding process. The post-processing filter block or circuit 528 filters the reconstructed data output by the in-loop filter block or circuit 507, in order to enhance the reconstructed data. The post-processing filter block or circuit 528 may be replaced by a neural network, such as a convolutional auto-encoder.

A resolution adaptation block or circuit 509: this block or circuit may downsample the input video frames, prior to encoding. Then, in the decoding loop, the reconstructed data may be upsampled, by the upsampling block or circuit 510, to the original resolution. The operation of the resolution adaptation block or circuit 509 block or circuit may be performed by a neural network such as a convolutional auto-encoder.

An encoder control block or circuit 511. This block or circuit performs optimization of encoder's parameters, such as what transform to use, what quantization parameters (QP) to use, what intra-prediction mode (out of N intra-prediction modes) to use, and the like. The operation of the encoder control block or circuit 511 may be performed by a neural network, such as a classifier convolutional network, or such as a regression convolutional network.

An ME/MC block or circuit 514 performs motion estimation and/or motion compensation, which are two operations to be performed when performing inter-frame prediction. ME/MC stands for motion estimation/motion compensation.

Figure 6:
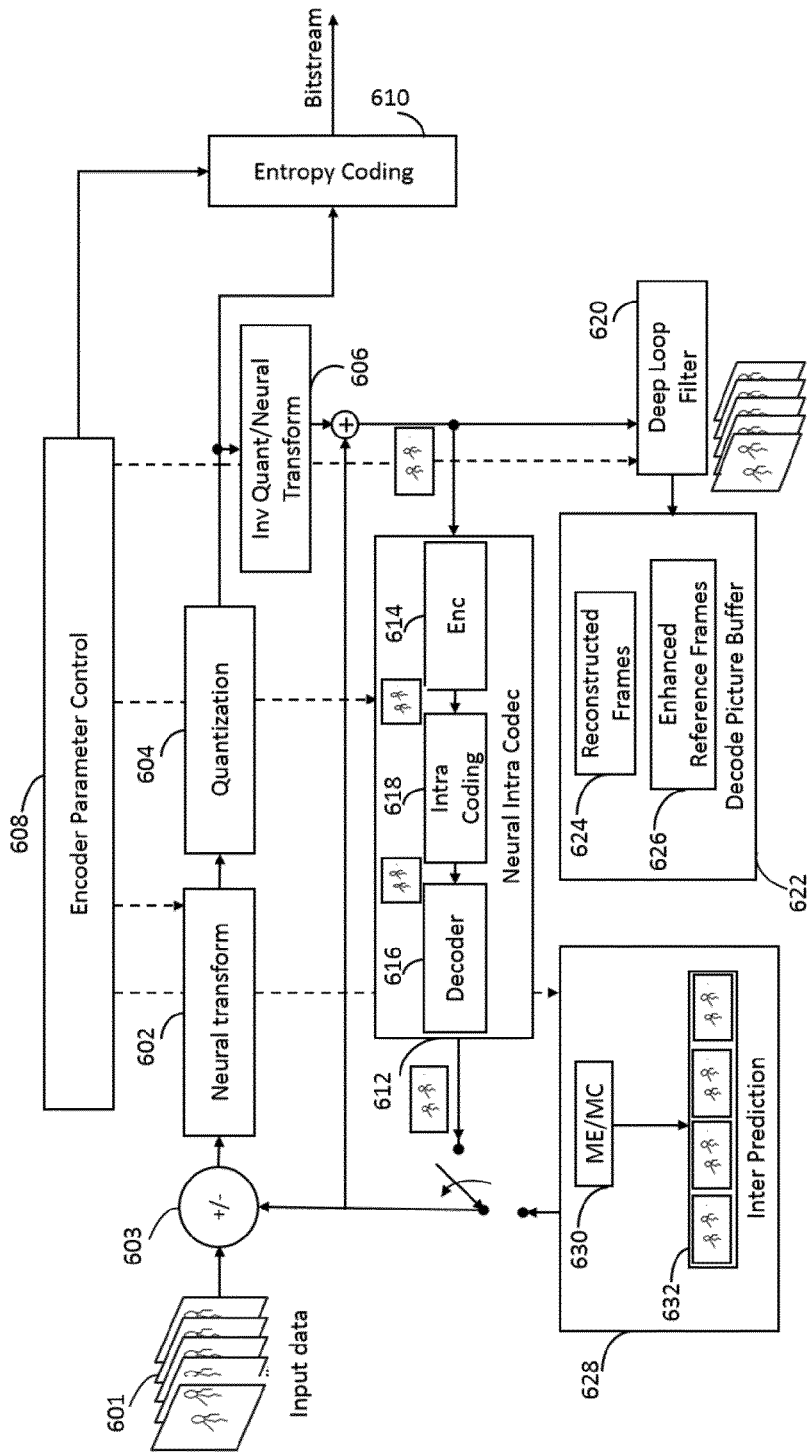
FIG. 6 illustrates re-use of a traditional video coding pipeline, with most or all components replaced with neural networks.

In another approach, commonly referred to as "end-to-end learned compression", NNs are used as the main components of the image/video codecs. In this second approach, there are two main options:

Option 1: re-use the video coding pipeline but replace most or all the components with NNs. Referring to FIG. 6, it illustrates an example of modified video coding pipeline based on a neural network, in accordance with an embodiment. An example of neural network may include, but is not limited to, a compressed representation of a neural network. FIG. 6 is shown to include following components:

A neural transform block or circuit 602: this block or circuit transforms the output of a summation/subtraction operation 603 to a new representation of that data, which may have lower entropy and thus be more compressible.

A quantization block or circuit 604: this block or circuit quantizes an input data 601 to a smaller set of possible values.

An inverse transform and inverse quantization blocks or circuits 606. These blocks or circuits perform the inverse or approximately inverse operation of the transform and the quantization, respectively.

An encoder parameter control block or circuit 608. This block or circuit may control and optimize some or all the parameters of the encoding process, such as parameters of one or more of the encoding blocks or circuits.

An entropy coding block or circuit 610. This block or circuit may perform lossless coding, for example based on entropy. One popular entropy coding technique is arithmetic coding.

A neural intra-codec block or circuit 612. This block or circuit may be an image compression and decompression block or circuit, which may be used to encode and decode an intra frame. An encoder 614 may be an encoder block or circuit, such as the neural encoder part of an auto-encoder neural network. A decoder 616 may be a decoder block or circuit, such as the neural decoder part of an auto-encoder neural network. An intra-coding block or circuit 618 may be a block or circuit performing some intermediate steps between encoder and decoder, such as quantization, entropy encoding, entropy decoding, and/or inverse quantization.

A deep loop filter block or circuit 620. This block or circuit performs filtering of reconstructed data, in order to enhance it.

A decode picture buffer block or circuit 622. This block or circuit is a memory buffer, keeping the decoded frame, for example, reconstructed frames 624 and enhanced reference frames 626 to be used for inter prediction.

An inter-prediction block or circuit 628. This block or circuit performs inter-frame prediction, for example, predicts from frames, for example, frames 632, which are temporally nearby. An ME/MC 630 performs motion estimation and/or motion compensation, which are two operations to be performed when performing inter-frame prediction. ME/MC stands for motion estimation/motion compensation.

Option 2: re-design the whole pipeline, as follows. Option 2 is described in detail in FIG. 7.

Encoder NN: performs a non-linear transform

Quantization and lossless encoding of the encoder NN's output.

Lossless decoding and dequantization.

Decoder NN: performs a non-linear inverse transform.

Figure 7:
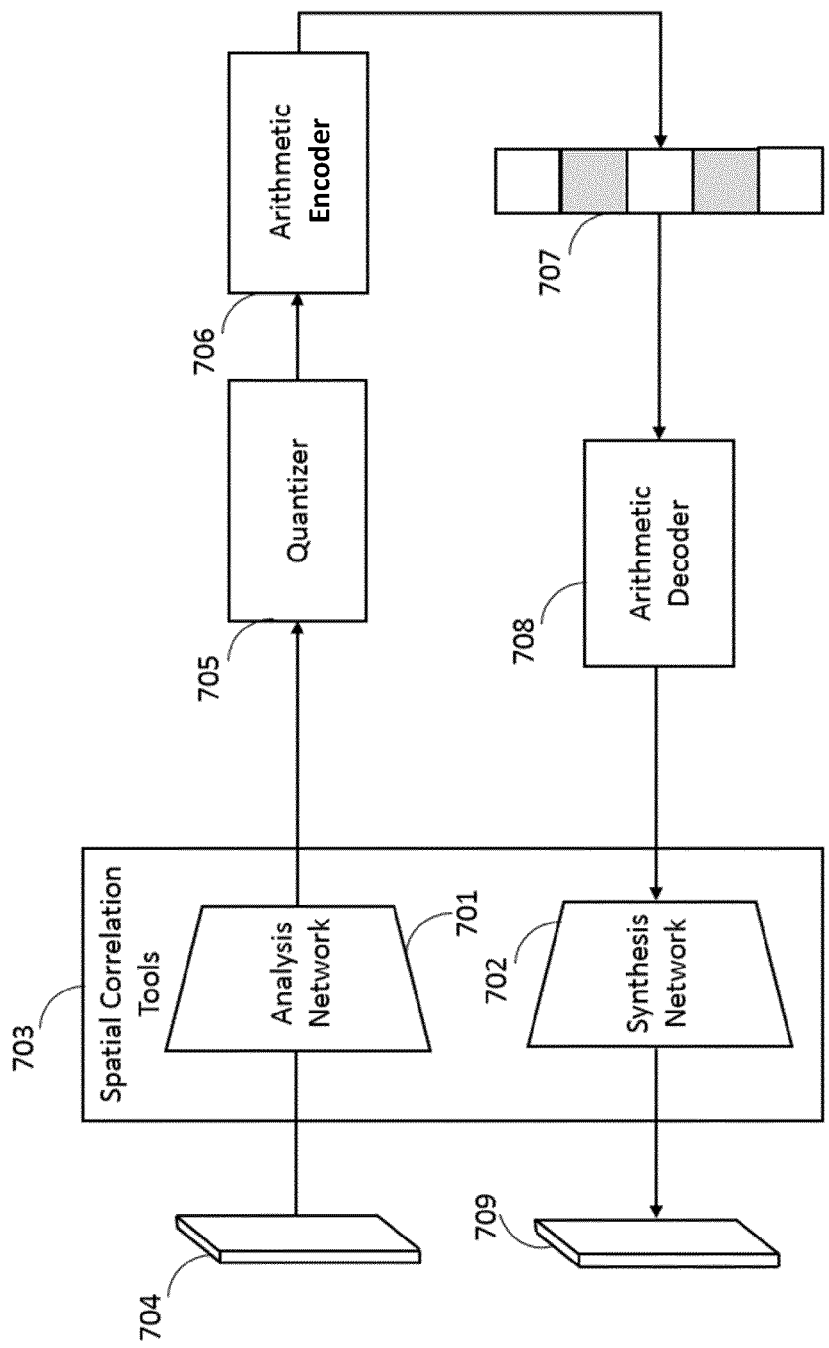
FIG. 7 shows a neural auto-encoder architecture, where the Analysis Network is the Encoder NN, the Synthesis Network is the Decoder NN.

FIG. 7 depicts an encoder and a decoder NNs being parts of a neural auto-encoder architecture, in accordance with an example. In FIG. 7, the Analysis Network 701 is an Encoder NN, and the Synthesis Network 702 is the Decoder NN, which may together be referred to as spatial correlation tools 703, or as neural auto-encoder.

In Option 2, the input data 704 is analyzed by the Encoder NN, Analysis Network 701, which outputs a new representation of that input data. The new representation may be more compressible. This new representation may then be quantized, by a quantizer 705, to a discrete number of values. The quantized data may be then lossless encoded, for example, by an arithmetic encoder 706, thus obtaining a bitstream 707. The example shown in FIG. 7 includes an arithmetic decoder 708 and an arithmetic encoder 706. The arithmetic encoder 706, or the arithmetic decoder 708, or the combination of the arithmetic encoder 706 and arithmetic decoder 708 may be referred to as arithmetic codec in some embodiments. On the decoding side, the bitstream is first lossless decoded, for example, by using the arithmetic codec decoder 708. The lossless decoded data is dequantized and then input to the Decoder NN, Synthesis Network 702. The output is the reconstructed or decoded data 709.

In case of lossy compression, the lossy steps may comprise the Encoder NN and/or the quantization.

In order to train the neural networks of this system, a training objective function, referred to as 'training loss', is typically utilized, which usually comprises one or more terms, or loss terms, or simply losses. Although here the Option 1 and FIG. 6 considered as example for describing the training objective function, a similar training objective function may also be used for training the neural networks for the systems in FIG. 4 and FIG. 5. In one example, the training loss comprises a reconstruction loss term and a rate loss term. The reconstruction loss encourages the system to decode data that is similar to the input data, according to some similarity metric. Examples of reconstruction losses are:

- a loss derived from mean squared error (MSE);
- a loss derived from multi-scale structural similarity (MS-SSIM), such as 1 minus MS-SSIM, or 1-MS-SSIM;
- Losses derived from the use of a pretrained neural network. For example, error (f1, f2), where f1 and f2 are the features extracted by a pretrained neural network for the input (uncompressed) and data the decoded (reconstructed) data, respectively, and error( ) is an error or distance function, such as L1 norm or L2 norm;
- Losses derived from the use of a neural network that is trained simultaneously with the end-to-end learned codec. For example, adversarial loss can be used, which is the loss provided by a discriminator neural network that is trained in an adversarial manner with respect to the codec, following the settings proposed in the context of generative adversarial networks (GANs) and their variants.

The rate loss encourages the system to compress the output of the encoding stage, such as the output of the arithmetic encoder. 'Compressing' for example, means reducing the number of bits output by the encoding stage.

When an entropy-based lossless encoder is used, such as the arithmetic encoder, the rate loss typically encourages the output of the Encoder NN to have low entropy. The rate loss may be computed on the output of the Encoder NN, or on the output of the quantization operation, or on the output of the probability model. Example of rate losses are the following:

- A differentiable estimate of the entropy.
- A sparsification loss, for example, a loss that encourages the output of the Encoder NN or the output of the quantization to have many zeros. Examples are L0 norm, L1 norm, L1 norm divided by L2 norm.
- A cross-entropy loss applied to the output of a probability model, where the probability model may be a NN used to estimate the probability of the next symbol to be encoded by the arithmetic encoder.

One or more of reconstruction losses may be used, and one or more of the rate losses may be used. All the loss terms may then be combined for example as a weighted sum to obtain the training objective function. Typically, the different loss terms are weighted using different weights, and these weights determine how the final system performs in terms of rate-distortion loss. For example, if more weight is given to one or more of the reconstruction losses with respect to the rate losses, the system may learn to compress less but to reconstruct with higher accuracy as measured by a metric that correlates with the reconstruction losses. These weights are usually considered to be hyper-parameters of the training session and may be set manually by the operator designing the training session, or automatically for example by grid search or by using additional neural networks.

For the sake of explanation, video is considered as data type in various embodiments. However, it would be understood that the embodiments are also applicable to other media items, for example images and audio data.

It is to be understood that even in end-to-end learned approaches, there may be components which are not learned from data, such as the arithmetic codec.

Further Information on Neural Network-Based End-to-End Learned Video Coding

Figure 8:
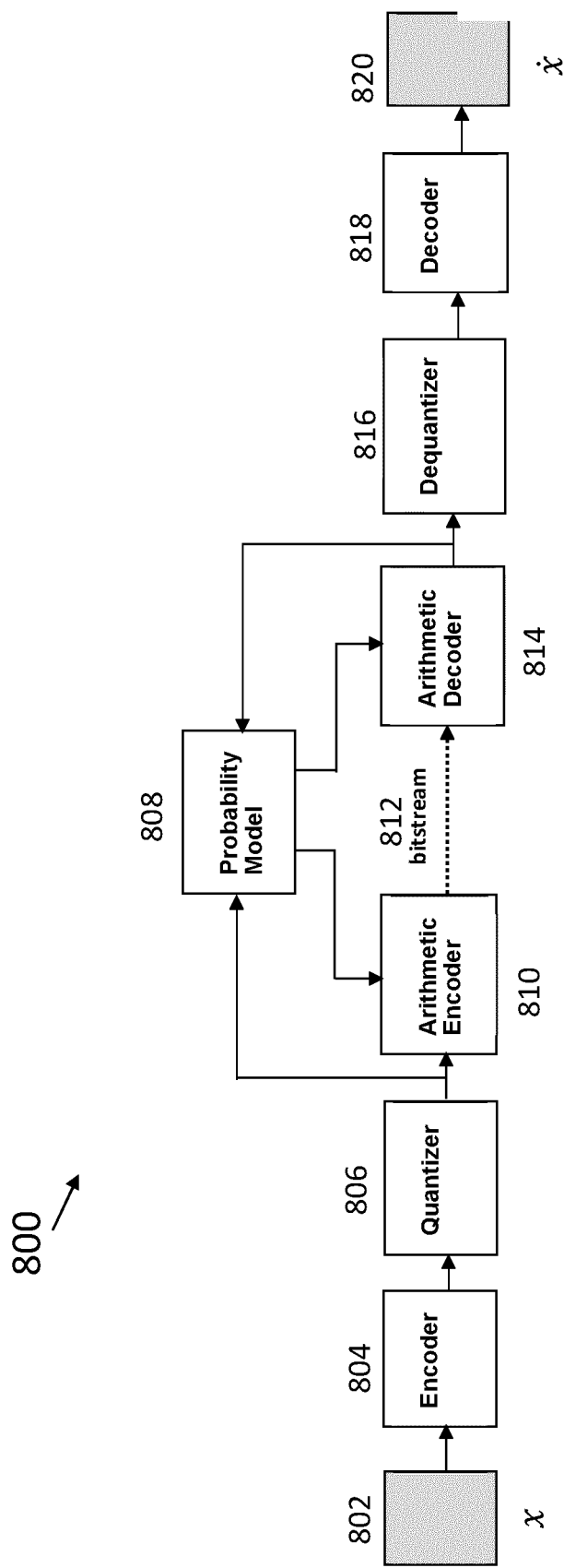
FIG. 8 shows a neural network-based end-to-end learned video coding system.

As shown in FIG. 8, a typical neural network-based end-to-end learned video coding system 800 contains encoder 804, quantizer 806, probability model 808, entropy codec 810/814 (for example arithmetic encoder/decoder), dequantizer 816, and decoder 818. The encoder 804 and decoder 818 are typically two neural networks, or mainly comprise neural network components. The probability model 808 may also comprise mainly neural network components. Quantizer 806, dequantizer 816 and entropy codec 810/814 are typically not based on neural network components, but they may also comprise neural network components, potentially.

On the encoder side, the encoder component 804 takes a video 802 as input and converts the video from its original signal space into a latent representation that may comprise a more compressible representation of the input. In the case of an input image, the latent representation may be a 3-dimensional tensor, where two dimensions represent the vertical and horizontal spatial dimensions, and the third dimension represent the "channels" which contain information at that specific location. If the input image 802 is a 128×128×3 RGB image (with horizontal size of 128 pixels, vertical size of 128 pixels, and 3 channels for the Red, Green, Blue color components), and if the encoder 804 downsamples the input tensor by 2 and expands the channel dimension to 32 channels, then the latent representation is a tensor of dimensions (or "shape") 64×64×32 (i.e., with horizontal size of 64 elements, vertical size of 64 elements, and 32 channels). Note that, the order of the different dimensions may differ depending on the convention which is used; in some cases, for the input image, the channel dimension may be the first dimension, so for the above example, the shape of the input tensor may be represented as 3×128×128, instead of 128×128×3. In the case of an input video (instead of just an input image), another dimension in the input tensor may be used to represent temporal information. The quantizer component 806 quantizes the latent representation into discrete values given a predefined set of quantization levels. Probability model 808 and arithmetic codec component 810/814 work together to perform lossless compression for the quantized latent representation and generate bitstreams 812 to be sent to the decoder side. Given a symbol to be encoded into the bitstream 812, the probability model 808 estimates the probability distribution of all possible values for that symbol based on a context that is constructed from available information at the current encoding/decoding state, such as the data that has already been encoded/decoded. Then, the arithmetic encoder 810 encodes the input symbols to bitstream 812 using the estimated probability distributions.

On the decoder side, opposite operations are performed. The arithmetic decoder 814 and the probability model 808 first decode symbols from the bitstream 812 to recover the quantized latent representation. Then the dequantizer 816 reconstructs the latent representation in continuous values and passes it to decoder 818 to recover the input video/image, as output video/image 820. Note that the probability model 808 in this system is shared between the encoding and decoding systems. In practice, this means that a copy of the probability model 808 is used at encoder side, and another exact copy is used at decoder side.

In this system, the encoder 804, probability model 808, and decoder 818 are normally based on deep neural networks. The system is trained in an end-to-end manner by minimizing the following rate-distortion loss function:

$$L = D + \lambda R,$$

where D is the distortion loss term, R is the rate loss term, and $\lambda$ is the weight that controls the balance between the two losses. The distortion loss term may be the mean square error (MSE), structure similarity (SSIM) or other metrics that evaluate the quality of the reconstructed video. Multiple distortion losses may be used and integrated into D, such as a weighted sum of MSE and SSIM. The rate loss term is normally the estimated entropy of the quantized latent representation, which indicates the number of bits necessary to represent the encoded symbols, for example, bits-per-pixel (bpp).

For lossless video/image compression, the system contains only the probability model 808 and arithmetic encoder/decoder 810/814. The system loss function contains only the rate loss, since the distortion loss is always zero (i.e., no loss of information).

Background Information on Video Coding for Machines (VCM)

Reducing the distortion in image and video compression is often intended to increase human perceptual quality, as humans are considered to be the end users, i.e. consuming/watching the decoded image. Recently, with the advent of machine learning, especially deep learning, there is a rising number of machines (i.e., autonomous agents) that analyze data independently from humans and that may even take decisions based on the analysis results without human intervention. Examples of such analysis are object detection, scene classification, semantic segmentation, video event detection, anomaly detection, pedestrian tracking, etc. Example use cases and applications are self-driving cars, video surveillance cameras and public safety, smart sensor networks, smart TV and smart advertisement, person re-identification, smart traffic monitoring, drones, etc. This may raise the following question: when decoded data is consumed by machines, shouldn't the systems/models aim at a different quality metric—other than human perceptual quality—when considering media compression in inter-machine communications? Also, dedicated algorithms for compressing and decompressing data for machine consumption are likely to be different than those for compressing and decompressing data for human consumption. The set of tools and concepts for compressing and decompressing data for machine consumption is referred to here as Video Coding for Machines.

It is likely that the receiver-side device has multiple "machines" or task neural networks (Task-NNs). These multiple machines may be used in a certain combination which is for example determined by an orchestrator subsystem. The multiple machines may be used for example in succession, based on the output of the previously used machine, and/or in parallel. For example, a video which was compressed and then decompressed may be analyzed by one machine (NN) for detecting pedestrians, by another machine (another NN) for detecting cars, and by another machine (another NN) for estimating the depth of all the pixels in the frames.

Notice that, for the examples described herein, "task neural network" are referred to "machine" and interchangeably, and this means any process or algorithm (learned or not from data) which analyzes or processes data for a certain task. In the rest of the description further details are specified concerning other assumptions made regarding the machines considered in the examples described herein.

Also, the terms "receiver-side" or "decoder-side" refer to the physical or abstract entity or device which contains one or more machines, and runs these one or more machines on some encoded and eventually decoded video representation which is encoded by another physical or abstract entity or device, the "encoder-side device".

The encoded video data may be stored into a memory device, for example as a file. The stored file may later be provided to another device.

Alternatively, the encoded video data may be streamed from one device to another.

Figure 9:
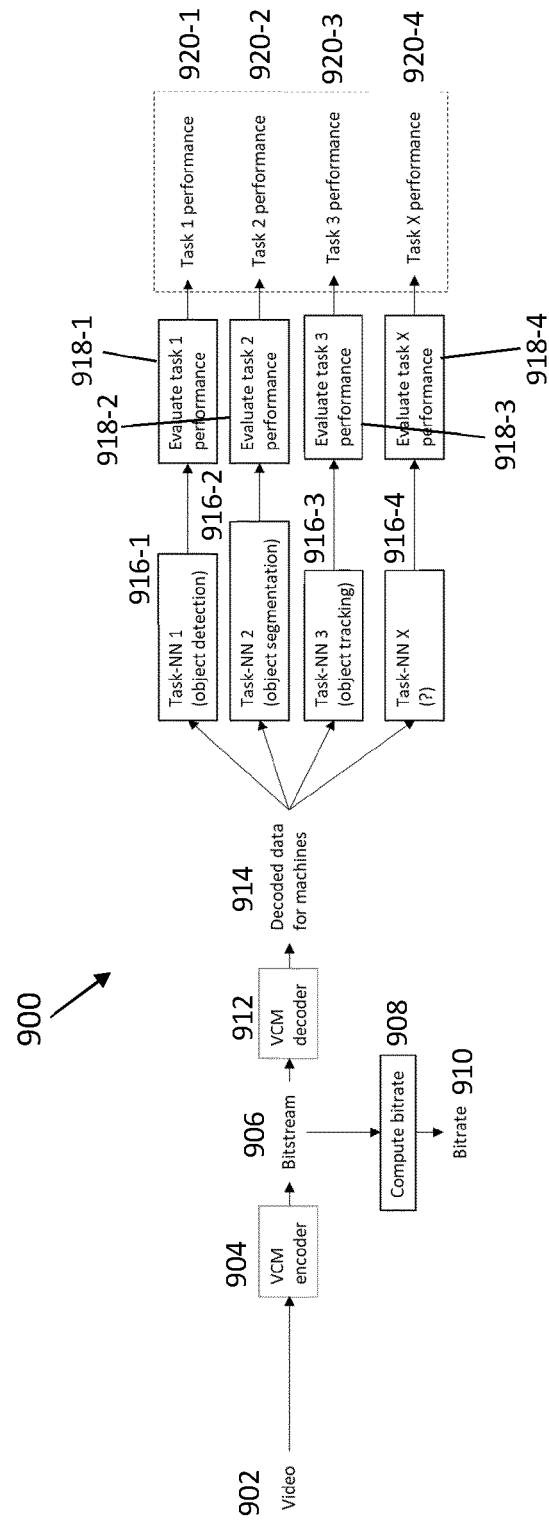
FIG. 9 is a general illustration of the pipeline of Video Coding for Machines.

FIG. 9 is a general illustration of the pipeline 900 of Video Coding for Machines. A VCM encoder 904 encodes the input video 902 into a bitstream 906. A bitrate 910 may be computed (908) from the bitstream 906 in order to evaluate the size of the bitstream 906. A VCM decoder 912 decodes the bitstream output 906 by the VCM encoder 904. In FIG. 9, the output of the VCM decoder is referred to as "Decoded data for machines" 914. This data may be considered as the decoded or reconstructed video. However, in some implementations of this pipeline, this data may not have same or similar characteristics as the original video which was input to the VCM encoder. For example, this data may not be easily understandable by a human by simply rendering the data onto a screen. The output of VCM decoder 914 is then input to one or more task neural networks 916. In FIG. 9, for the sake of illustrating that there may be any number of task-NNs 916, there are three example task-NNs (one for object detection 916-1, one for object segmentation 916-2, and another for object tracking 916-3), and a non-specified one (Task-NN X 916-4). The goal of VCM is to obtain a low bitrate while guaranteeing that the task-NNs still perform well in terms of the evaluation metric associated to each task.

Shown also within the pipeline 900 of Video Coding for Machines is the evaluation 918 of the various task NNs (including respective evaluations 918-1, 918-2, 918-3, and 918-4), and the performance 920 of the various task NNs (including respective performances 920-1, 920-2, 920-3, and 920-4.

Figure 10:
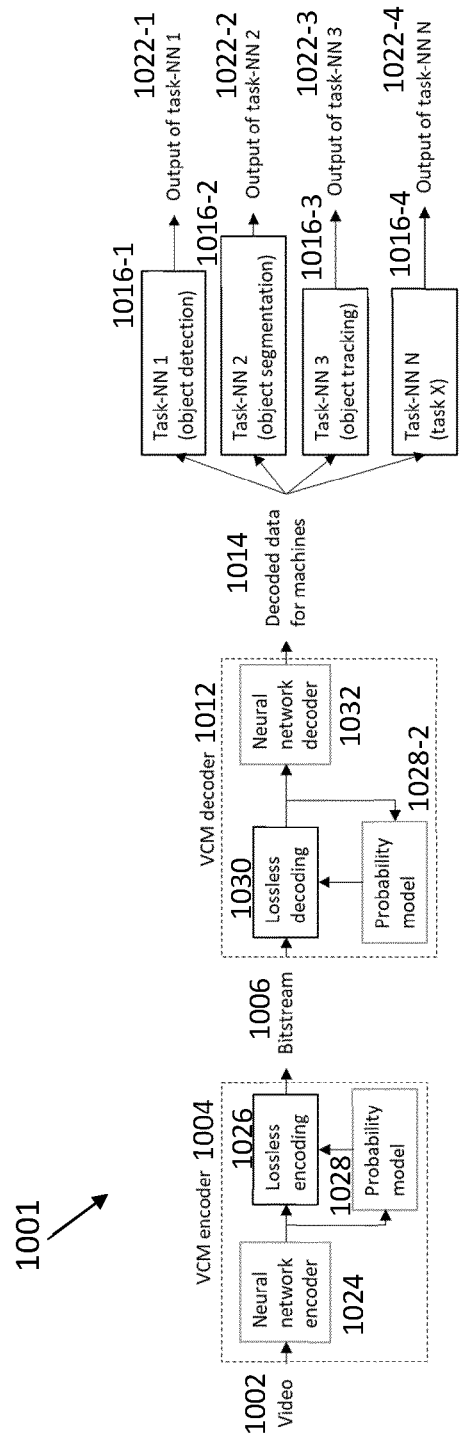
FIG. 10 illustrates an example of a pipeline for an end-to-end learned approach for video coding for machines.

One of the possible approaches to realize video coding for machines is an end-to-end learned approach. In this approach, the VCM encoder 1004 and VCM decoder 1012 mainly consist of neural networks. FIG. 10 illustrates an example of a pipeline 1001 for the end-to-end learned approach. The video 1002 is input to a neural network encoder 1024. The output of the neural network encoder 1024 is input to a lossless encoder 1026, such as an arithmetic encoder, which outputs a bitstream 1006. The lossless codec may be a probability model 1028 (including 1028 and 1028-2), both in the lossless encoder 1026 and in the lossless decoder 1030, which predicts the probability of the next symbol to be encoded and decoded. The probability model 1028 may also be learned, for example it may be a neural network. At the decoder-side, the bitstream 1006 is input to a lossless decoder 1030, such as an arithmetic decoder, whose output is input to a neural network decoder 1032. The output of the neural network decoder 1032 is the decoded data for machines 1014, that may be input to one or more task-NNs 1016.

As further shown in FIG. 10, each task NN 1016 (including task NNs 1016-1, 1016-2, 1016-3, and 1016-4) has an output 1022, shown respectively as outputs 1022-1, 1022-2, 1022-3, and 1022-4.

Figure 11:
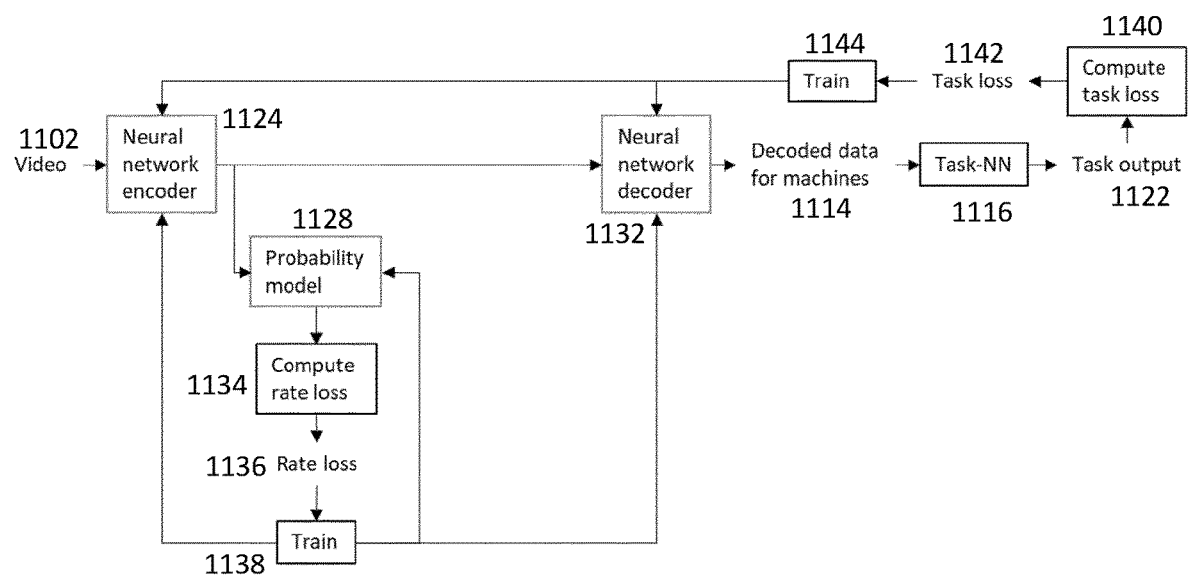
FIG. 11 illustrates an example of how the end-to-end learned system for video coding for machines may be trained.

FIG. 11 illustrates an example of how the end-to-end learned system may be trained. For the sake of simplicity, only one task-NN 1116 is illustrated. A rate loss 1136 may be computed (at 1134) from the output of the probability model 1128. The rate loss 1136 provides an approximation of the bitrate required to encode the input video data. A task loss 1142 may be computed (at 1140) from the output 1122 of the task-NN 1116.

The rate loss 1136 and the task loss 1142 may then be used to train (at 1138 and 1144) the neural networks used in the system, such as the neural network encoder 1124, the probability model 1128, and the neural network decoder 1132. Training may be performed by first computing gradients of each loss with respect to the neural networks that are contributing or affecting the computation of that loss. The gradients are then used by an optimization method, such as Adam, for updating the trainable parameters of the neural networks.

As further shown in FIG. 11, the video 1102 is input into the neural network encoder 1124, and the output of the training 1138 and the output of the neural network encoder 1124 are input to the neural network decoder 1132, which generates decoded data for machines 1114.

The machine tasks may be performed at decoder side (instead of at encoder side) for multiple reasons, for example because the encoder-side device does not have the capabilities (computational, power, memory) for running the neural networks that perform these tasks, or because some aspects or the performance of the task neural networks may have changed or improved by the time that the decoder-side device needs the tasks results (e.g., different or additional semantic classes, better neural network architecture). Also, there could a be customization need, where different clients would run different neural networks for performing these machine learning tasks.

Alternatively to an end-to-end trained codec, a video codec for machines can be realized by using a traditional codec such as H.266/VVC.

Alternatively, as described already above for the case of video coding for humans, another possible design may comprise using a traditional codec such as H.266/VVC, which includes one or more neural networks. In one possible implementation, the one or more neural networks may replace one of the components of the traditional codec, such as:
One or more in-loop filters.
One or more intra-prediction modes.
One or more inter-prediction modes.
One or more transforms.
One or more inverse transforms.
One or more probability models, for lossless coding.
One or more post-processing filters.

In another possible implementation, the one or more neural networks may function as an additional component, such as:
One or more additional in-loop filters.
One or more additional intra-prediction modes.
One or more additional inter-prediction modes.
One or more additional transforms.
One or more additional inverse transforms.
One or more additional probability models, for lossless coding.
One or more additional post-processing filters.

Alternatively, another possible design may comprise using any codec architecture (such as a traditional codec, or a traditional codec which includes one or more neural networks, or an end-to-end learned codec), and having a post-processing neural network which adapts the output of the decoder so that it can be analyzed more effectively by one or more machines or task neural networks. For example, the encoder and decoder may be conformant to the H.266/VVC standard, a post-processing neural network takes the output of the decoder, and the output of the post-processing neural network is then input to an object detection neural network. In this example, the object detection neural network is the machine or task neural network.

In case the VCM codec consists of a traditional video codec (such as H.266/VVC), this codec may not perform well on the computer vision tasks such as object tracking and object segmentation, since the traditional codecs are optimized to perform well for human consumption purposes.

The idea is to use traditional image/video codecs (e.g., H.265/HEVC or H.266/VVC) for encoding and decoding the content and later adapting the decoded data to the target task network by applying a post processing NN.

The examples described herein provide as auxiliary input to the post processing NN one or more types of information which is readily available within the conventional decoders and/or within the bitstream output by conventional encoders. This information may be related to the internal codec's decisions such as partitioning information, intra and inter prediction modes, transform types and so on. This information is used to enhance the task performance. Importantly, this information comes at no extra cost in terms of bitrate with respect to the bitrate that is output by a traditional encoder for the case of human consumption, as it is already available at the decoder side for the proper functioning of the conventional decoder. The auxiliary information is provided to the NN filter at both training phase and inference phase.

With the auxiliary information, the content can be encoded in lower qualities and is enhanced after decoding which results in lower bitrate while achieving the same or higher task performance when encoding them in higher qualities.

It is to be noted that, alternatively or in addition to a traditional/conventional codec, a learned codec which may have been originally designed for targeting the human consumption use case may be considered too, where the bitstream or the learned decoder may comprise or may output information which can be used as auxiliary input to the post-processing NN.

In one alternative or additional embodiment, the bitstream or information output by the one or more operations of the decoder may be input to one or more processing operations, where the one or more processing operations may be neural networks. The output of the one or more processing operations may be used as the auxiliary information that is input to the post-processing NN. In this embodiment, the one or more processing operations s function as mapping the bitstream or information output by the one or more operations of the decoder to information that is more suitable to be input to the post-processing NN.

Preliminary Information and Assumptions

Considered herein is the case of compressing and decompressing data which is consumed by machines. The decompressed data may also be consumed by humans, either at the same time or at different times with respect to when the machines consume the decompressed data. The codec may consist of multiple parts, where some parts are used for compressing or decompressing data for machine consumption, and some other parts are used for compressing or decompressing data for human consumption.

As described herein it is assumed that an encoder-side device performs a compression or encoding operation by using an encoder. A decoder-side device performs decompression or decoding operation by using a decoder. The encoder-side device may also use some decoding operations, for example in a coding loop. The encoder-side device and the decoder-side device may be the same physical device, or different physical devices.

The examples described herein are not restricted to any specific type of data. However, for the sake of simplicity the examples described herein consider video data. As used herein, "video" may mean one or more video frames, unless specified otherwise. Other example types of data are images, audio, speech, text.

Machines may also be referred to as task neural networks, or task-NNs. An example of a task-NN is an object detection neural network, performing an object detection task. Another example is a semantic segmentation neural network, performing semantic segmentation (e.g. semantic image segmentation). The input to a task-NN may be one or more video frames. The output of the task-NN may be a task result, or task output. An example of task result, for the case of an object detection task-NN, is a set of coordinates of one of more bounding boxes, representing the location and spatial extent of detected objects. Also, an object detection task-NN may output other data, such as the category or class of the detected objects, and a confidence value indicating an estimate of the probability that the bounding box and/or its class for a detected object is correct. An example of a task result, for the case of a semantic segmentation task-NN, is a tensor of shape (K, H, W), where K may be the total number of semantic classes considered by the task-NN, H and W may be the height and width of the input video frame that was input to the task-NN. Each of the K matrices of size H×W may represent the segmentation of the K-th class, i.e., it may indicate whether each pixel of the input video frame belongs to the K-th class or not. In case the number of video frames that are input to the task-NN is T, the output of the task-NN may be a tensor of shape (T, K, H, W).

It is assumed that at least some of the task-NNs (machines) are models, such as neural networks, for which it is possible to compute gradients of their output with respect to their input. For example, if they are parametric models, this may be possible by computing the gradients of their output first with respect to their internal parameters and then with respect to their input, by using the chain rule for differentiation in mathematics. In the case of neural networks, backpropagation may be used to obtain the gradients of the output of a NN with respect to its input.

Figure 12:
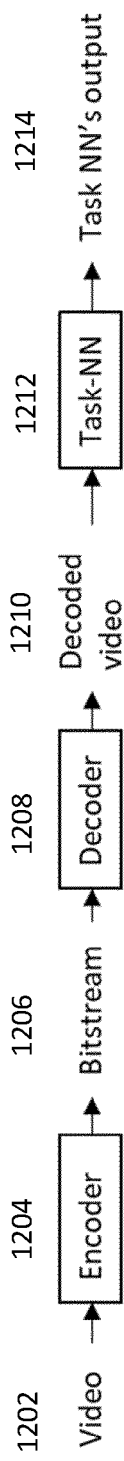
FIG. 12 illustrates an example baseline system for video coding and decoding using a task NN.

FIG. 12 illustrates an example baseline system for video coding and decoding using a task NN. With reference to FIG. 12, the baseline system comprises at least one encoder 1204, at least one decoder 1208, and at least one task-NN 1212. The described embodiments build on top of this baseline system.

In FIG. 12, the encoder 1204 may be any traditional video encoder, such as a traditional encoder which is conformant with the H.266/VVC standard, or an encoder which combines a traditional encoder with one or more neural networks.

The decoder 1208 may be any traditional video decoder, such a traditional decoder which is conformant with the H.266/VVC standard, or a decoder which combines a traditional decoder with one or more neural networks.

Refer to the earlier part of this description, including the description of FIG. 5, for more details about a codec which combines a traditional codec with one or more neural networks.

The Task-NN 1212 may be any task neural network performing an analysis task or a processing task. As described herein, semantic segmentation is considered as an example task.

In this baseline system, the input image/video 1202 is encoded into a bitstream 1206 by an Encoder 1204. A Decoder 1208 decodes the bitstream 1206 into a decoded image/video 1210. The decoded image/video 1210 is given as input to a task-NN 1212. The task-NN 1212 outputs some analysis or processing results 1214. The output 1214 of a task-NN 1212 may be referred to either as "output" or as "result" interchangeably.

Figure 13:
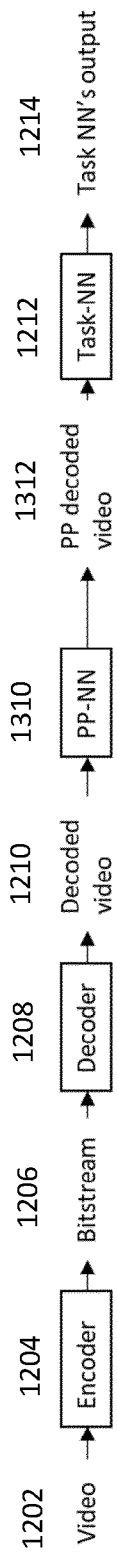
FIG. 13 illustrates an example baseline system which comprises a post-processing neural network.

With reference to FIG. 13, the baseline system may comprise a post-processing neural network 1310 which may be part of the decoder 1208, or may be external with respect to the decoder 1208. The post-processing neural network 1310 may post-process the decoded image/video 1210. The post-processed decoded data 1312 may then be input to the task-NNs 1212. FIG. 13 illustrates the example baseline system having a post-processing neural network 1310. Here, PP-NN refers to the post-processing neural network 1310, and PP decoded video refers to the post-processed decoded video 1312.

Figure 14:
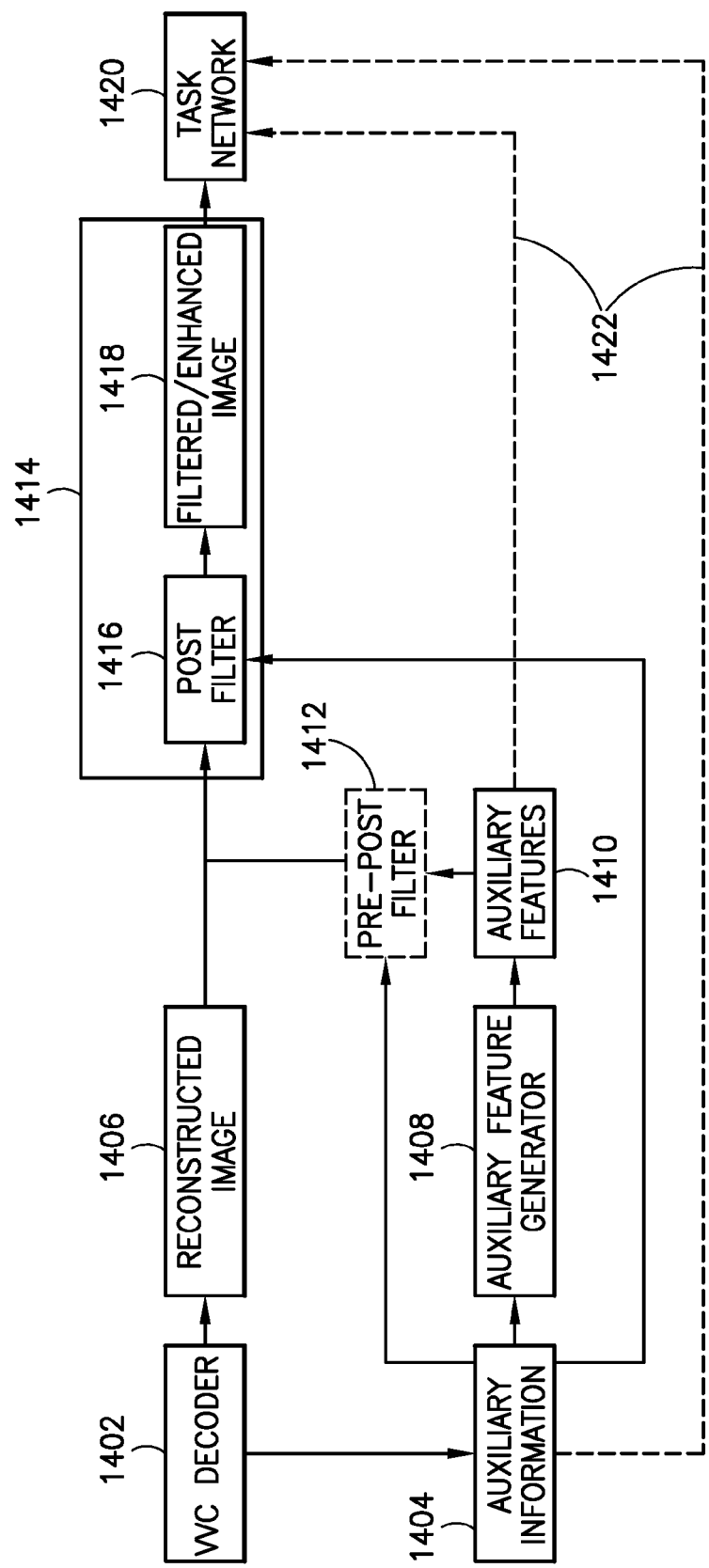
FIG. 14 illustrates utilizing auxiliary information of a VVC codec.

With reference to FIG. 14, described herein is a method of applying a post-processing neural network-based filter 1416 to the decoded/reconstructed images and videos 1406 in a way that it improves the target computer vision task's accuracy. The post-processing NN filter 1416 is applied to the decoded data 1406 that may be output by a traditional codec, such as VVC 1402, or a traditional codec that is combined with one or more neural networks.

In order to improve the task-NN accuracy (e.g. accuracy of the task network 1420), the filter 1416 in the training and/or testing stage makes use of auxiliary information 1404 from the traditional codec such as VVC 1402 and/or one or more auxiliary features 1410 generated from auxiliary information 1404 from the traditional codec such as VVC 1402 by one or more auxiliary feature generators 1408. Note that more than one auxiliary feature 1410 may be generated from one type of auxiliary information 1404. Also note, conversely, that multiple types of auxiliary information 1404 may be combined to generate (via 1408) one auxiliary feature 1410.

In another embodiment, the auxiliary information 1404 and/or the one or more auxiliary features 1410 may be used as one or more inputs (see item 1422) to the task network 1420, for example, injected into one of the intermediate layers of the task network 1420.

In yet another embodiment, the auxiliary feature 1410 could be generated (via 1408) based on aggregation of several items of auxiliary information 1404 provided over time. The set of information could comprise the same data or several pieces of data that have been available during a period of time. The aggregation and generation of the auxiliary feature could be achieved via a learning algorithm or a pre-determined scheme.

The auxiliary feature 1410 may be a 3-dimensional tensor with two spatial dimensions and one channel dimension. The spatial resolution may be the same as the reconstructed image 1406 or may be the same as a downsampled or upsampled reconstructed image. The channels of the auxiliary feature may contain the auxiliary information for each pixel, for example, a binary value indicating the usage of a specific coding tool, an index value of the selected mode for a coding tool, or an integer or floating-point value for a property associated with the pixel.

In another embodiment, there may be multiple post filters at the decoder side. A common post filter may be used for general machine tasks or unknown machine tasks. Specific post filters may be used for certain types of tasks, for example, a post filter is dedicated to machine tasks that are similar to object detection, and another post filter is dedicated to a face recognition task. Each post filter may use a different set of auxiliary information.

FIG. 14 shows the example of how the method of the examples described herein is used by utilizing the auxiliary information 1404 of the VVC codec and/or the auxiliary features 1410. As further shown in FIG. 14, a pre-post filter 1412 may be applied to auxiliary information 1404 and/or the one or more auxiliary features 1410, and the output of the pre-post filter 1412 may be provided to the post filter 1416. Operation 1414 comprises the post filter 1416, where the post filter 1416 generates the filtered/enhanced image 1418. As shown in FIG. 14, the filtered/enhanced image 1418 is provided via operation 1414 to the task network 1420. Operation 1414 comprises the post filter 1416 and the filtered/enhanced image 1418.

The decoder-side auxiliary information 1404 from a traditional codec may be one or more of the following items:
  High level information such as picture/slice type (for example, intra/inter picture/slice, or any other picture/slice types that are defined in video coding specifications such as IDR, CRA, RADL, RASL, etc.).
  Quantization parameters of the pictures/slices/CTUs/CUs/Pus.
  Temporal layer ID of the pictures/slices. A temporal layer (also referred to as sublayer, sub-layer, temporal sublayer or temporal sub-layer) with a particular ID value does not depend on any temporal layers with a greater ID value. Thus, a temporal layer with ID 0 can be decoded without any other temporal layers (greater than 0); pictures of temporal layer ID 0 and 1 can be decoded without any pictures having ID greater than 1, and so on. Temporal layers provide temporal scalability and may correspond to a certain picture rate. For example, decoding of a temporal layer with ID 0 may result into a 30 Hz picture rate, and decoding of temporal layers 0 and 1 may result into a 60 Hz picture rate.
  Block partitioning information such as CTU partitioning, CU partitioning, sub-block partitioning, etc.
  Block level coding mode information, such as intra or inter coded block.
  Block level intra prediction information such as intra prediction directions, intra prediction modes, etc.
  Block level inter prediction information such as inter prediction modes (affine, merge, AMVP, etc.), reference pictures used for inter prediction, motion vectors or motion vector field information in block level or sub-block level.
  Reference picture resampling information, such as the scaling windows of the current picture and the reference picture (s).
  Block level transform modes such as DCT, DST, or corresponding LFNST transform modes or sub-block transform coding information.
  Block level information about the residual information of that block. For example, whether the block includes any residual coding or not. The auxiliary information may include the block level residuals as well.
  The information about in-loop and post processing filters such as Adaptive Loop Filter (ALF), Sample Adaptive Offset (SAO), De-Blocking Filter (DBF), etc. For example, the information may indicate block-wise which ALF filter has been used in a picture.
  Information on an encoding configuration, such as the lambda value or alike indicating a weighting between rate and distortion in the encoder's coding mode choices, or bit budget for pictures/slices/CTUs/CUs/PUs. Such information could be delivered to the method of the examples described herein through for example an SEI message mechanism of the underlying codec.
  Information on encoder-side analysis results, such as scene cut detection. Such information could be delivered to the method of the examples described herein through for example an SEI message mechanism of the underlying codec.
  The information about pre-processing operations prior to encoding, for example Motion Compensated Temporal Filter (MCTF), denoising, etc. Such information could be delivered to the method of the examples described herein through for example an SEI message mechanism of the underlying codec.

Note that the term block may refer to a Coding Unit (CU), Prediction Unit (PU), Transform Unit (TU), Coding Tree Unit (CTU), a Tile, a Slice, etc.

Figure 15A:
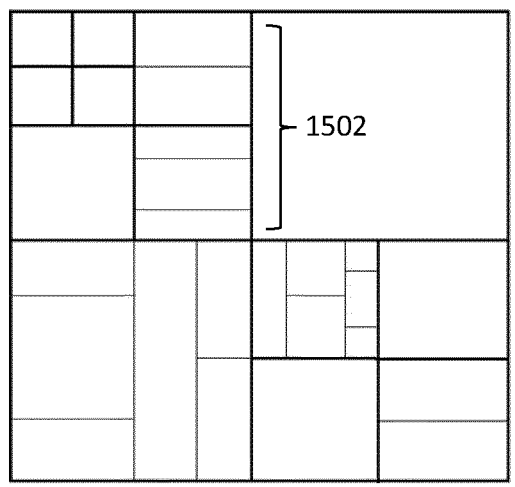
FIG. 15A shows an example of a block partitioning map where the partition boundaries are marked in a binary image.
Figure 15B:
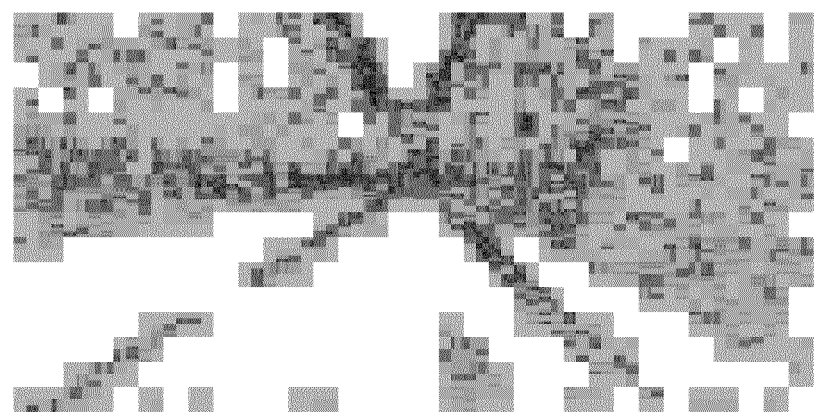
FIG. 15B shows another example of a block partitioning map where a grayscale image is generated by assigning all pixels in a partition block to a value indicating the block.

In embodiment, an the decoder-side auxiliary information 1404 may be the block partitioning information of the corresponding image/video (such as that shown in FIG. 15A and FIG. 15B). The block partitioning information may represent the regions of interest for the computer vision tasks. For example, smaller blocks may represent the importance of that region inside the image and it may guide the post processing filter 1416 to have better enhancement for those regions. The examples described herein may use one or more of the partitioning information of different channels of the image/video, for example, one or more of R, G, B channel information in RGB color format or one or more of Y, Cb, Cr channel information in YCbCr color format.

In an embodiment, the auxiliary information 1404 generated using the block partitioning information and/or the auxiliary feature 1410 generated using the block partitioning information may be a block partition map in an image format. The block partition map can have the same resolution or different resolution as the reconstructed image 1406. An example of a block partitioning map is shown in FIG. 15A where the partition boundaries (such as boundary 1502) are marked in a binary image. Another example of a block partitioning map is shown in FIG. 15B where an image is generated by assigning all pixels in a partition block to a value indicating the block. The details are described in the next embodiment.

In an embodiment, different blocks in the partitioning map may be labeled prior to using it in the post processing filter. Predefined values may be assigned to different block sizes. Alternatively, the label value of each block may correspond to the size of that block. An example of this embodiment is shown in FIG. 15B. The labelling of each channel's block partitioning information may be in the same way or in a separate way.

In an embodiment, the block partitioning maps may be labelled with other auxiliary information in the decoder side such as intra prediction directions, quantization parameters, motion vectors, transform modes, etc.

In an embodiment, the auxiliary information 1404 and/or the auxiliary features 1410 may be the intra prediction information of the blocks in each frame. For example, the intra prediction modes such as angular prediction modes, Matrix-based Intra prediction modes, Cross-Component Linear Model (CCLM) modes, Intra Sub-Partition modes (ISP), Intra Block Copy (IBC), Multi Reference Line (MRL) modes, Position Dependent Prediction Combination (PDPC), Block Differential Pulse Coded Modulation (BDPCM) or any other intra prediction tools used for certain block.

In an embodiment, the auxiliary information 1404 and/or the auxiliary features 1410 may be the inter prediction information of the blocks in each frame. For example, it may be inter prediction modes such as Affine mode, Merge mode, AMVP mode, Geometrical Partitioning Mode (GPM), Merge Mode with MVD (MMVD), Symmetric MVD (SMVD), Subblock-based Temporal Motion Vector Prediction (SbTMVP), Adaptive Motion Vector Resolution (AMVR), Bi-prediction with CU-level Weight (BCW), Bi-directional Optical Flow (BDOF), Decoder Side Motion Vector Refinement (DMVR), Combined Inter and Intra Prediction (CIIP), or any other inter prediction mode in the codec.

In another embodiment, the motion vector information of the inter predicted blocks may be used as auxiliary information 1404 to the post processing filter 1416 or as the auxiliary feature 1410 to the post processing filter 1416. For that the motion vectors in the block level or sub-block level (4×4, 8×8 or any other sub-blocks sizes) may be used.

In an embodiment, the motion information or motion vectors may be scaled according to the reference picture of the target task NN 1420. For example, in a traditional codec, frame N uses frame M as reference for motion estimation and/or motion compensation but the task NN (for example object tracking) uses frame P of the video sequence as reference, then the motion vectors/information may be scaled in a way that they match with the reference of the target task NN. The scaling may be done based on the temporal distance of the current frame to the reference frame (s) in the traditional codec as well as reference frame (s) in the target task NN. Alternatively, the scaling may be done based on a learned approach, i.e., by learning the way the scaling is performed based on a database of images and/or videos, for example by training a neural network to output one or more scaling factors, where the training may be based on minimizing a loss function such as a rate-distortion function.

In an embodiment, the transform information, for example the choice of DCT or DST, may be used as additional information for the NN filter 1416. For this, transform information may comprise primary and/or secondary transform (e.g. LFNST) selections for each block. In case of using LENST, the corresponding LENST index may be used as well. The channels of the auxiliary feature generated from these types of information may contain the transform information for the pixels.

In another embodiment, the residual information in the decoder side may be considered as an auxiliary information 1404 or as the auxiliary feature 1410 for the NN filter 1416. For that, residuals of each block may be fed to the NN filter 1416 directly. In an alternative way, the amount of residual for each block may be used as a mechanism to label to partition maps that are discussed in above embodiments. In this case, if a block does not have any residuals, then a certain label/value in the partition map information is assigned to that block or if a block contains high levels of residuals then a different set of labels/values is assigned to the corresponding partition map of that block. In an alternative way, the labeling or assigning an importance value based on residual information of each block may be done according to a pre-defined threshold. For example, multiple thresholds may be defined based on an average or absolute average of residual values of that block. In a similar way, the labelling or assigning the importance value for each partition map may be done based on the coefficients of the corresponding transform of that block.

In an embodiment, the auxiliary information 1404 and/or the auxiliary feature 1410 to the NN filter 1416 may be based on or derived from information related to one or more of the in-loop/post-processing filters in traditional video codecs. For example, block-level usage of ALF, CCALF, SAO, DBF filters of VVC may be used as additional information to the NN filter. In case of ALF and CCALF, the filter parameters that are used in that block or CTU may be used. In case of SAO, the type of SAO filter (band offset or edge offset) may be used as auxiliary information. In the DBF case, the auxiliary information could be boundary strength information of the filter in each block and may be considered for additional input to the NN filter. It needs to be understood that these cases are only examples of how different aspects of the traditional codec's filtering information may be used and the examples described herein are not limited to them; any information that is available in the decoder side may be considered as auxiliary input (1404, 1410) to the NN filter (1412, 1414, 1416).

In another embodiment, the auxiliary information 1404 and/or the auxiliary feature 1410 to the NN filter 1416 may comprise encoder-side pre-processing information. For example, some information regarding pre-processing filtering may be used as auxiliary information to the NN filter. As an example, Motion Compensated Temporal Filter (MCTF) may be used as a pre-processing filter prior to encoding. The strength of MCTF filter in sequence level, frame level, CTU level or CU level may be used as additional information for improving the task performance through the NN filter. In case of using encoder-side only tools, the corresponding auxiliary information needs to be delivered to the decoder side for example through the SEI message mechanism of the current codecs.

In an embodiment, the selection of suitable auxiliary information 1404 from traditional codecs may be done based on the target task NN 1420. For the common post filter or the task specific post filters, all or a subset of the described information may be used. The selection of the correct subset of decoder-side information for each task NN may be done based on a learning approach, for example, using a feature selection technique.

According to another embodiment, a baseline NN filter 1416 may be trained without the use of a traditional video codec's information in a way that it provides reasonable improvements in one or more task NNs 1420. The baseline NN filter then may be finetuned for one or more tasks NNs by using all or a subset of decoder side information in a way that it provides better task performance for the target task NN than the baseline filter.

In another embodiment, the baseline NN filter 1416 may be trained by using a subset of decoder side information in a way that a subset of auxiliary information 1404 provides reasonable improvements for one or more task NNS 1420. The baseline NN filter then may be finetuned by using another set or subset of decoder side information in a way that it brings more improvements for one or more target task NNs when compared to the baseline NN filter.

In an embodiment, the selection of decoder-side information may be signaled to the decoder 1402 for example through SEI messages or any other mechanism. The encoder may determine the selection of decoder-side information via a proxy task network, which is a network used to estimates the performance of the task network 1420 without the information of the task nor the details of the task network. An example of such proxy task network is a subset of a VGG network that can be used to calculate the perceptual loss of the codec. In the case of having multiple task NNs and multiple post filters where the subset of decoder side information may be different for one or more of the task specific post filters, the corresponding subset of decoder-side information may be signaled to the decoder.

In an embodiment, the encoder-side may signal to the decoder-side whether or not to input the auxiliary information to the post-processing filter.

In an embodiment, the encoder may signal some information on whether to use the post-processing filter in the decoder side or not. The signalling mechanism may take into account whether applying the post-processing filter provides improvements on one or more task NNs. This may be done by a predefined threshold for the task performance improvement in the encoder side. Alternatively, instead of signalling the usage of the post-processing filter, the decision of whether to use the post-processing filter on one or more tasks may be done by an analysis of the decoded data in the decoder side. This may be also done by analysing one or more of the decoder-side information. For example, the decision on using the post filter on the decoded data (in video level, image level, Slice level, Tile level, CTU level, CU level, etc.) may be done by checking the quantization parameter (s) of that unit of data.

In an embodiment, if there are multiple post processing filters available in the decoder side, the choice of optimal post processing filter may be signaled to the decoder. For example, in the decoder side, the baseline filter as well as one or more enhanced post-processing filters (trained with one or more decoder-side auxiliary information) may be available. The encoder may signal to the decoder to use the suitable filter for a certain task or subset of tasks. Alternatively, the decision of choosing which version of the filter in the decoder side may be done by applying an analysis of the decoded data and/or decoder side auxiliary information.

In an embodiment, the encoder-side may signal to the decoder-side one or more parameters that may be used to process the auxiliary information, and the processed auxiliary information may then be input to the post-processing filter. An example of processing of auxiliary information may be a scaling (multiplication) of one or more values of the auxiliary information, and the one or more parameters that are signaled by the encoder-side may be one or more scaling values that may be used to scale or multiply one or more values of the auxiliary information.

It is to be noted that, alternatively or in addition to a traditional/conventional codec, a learned codec which may have been originally designed for targeting the human consumption use case may be considered too, where the bitstream or the learned decoder may comprise or may output information which can be used as auxiliary input to the post-processing NN.

In one alternative or additional embodiment, the bitstream or information output by the one or more operations of the decoder may be input to one or more processing operations, where the one or more processing operations may be neural networks. The output of the one or more processing operations may be used as the auxiliary information 1404 that is input to the post-processing NN 1416. In this embodiment, the one or more processing operations function as mapping the bitstream or information output by the one or more operations of the decoder to information that is more suitable to be input to the post-processing NN.

Figure 16:
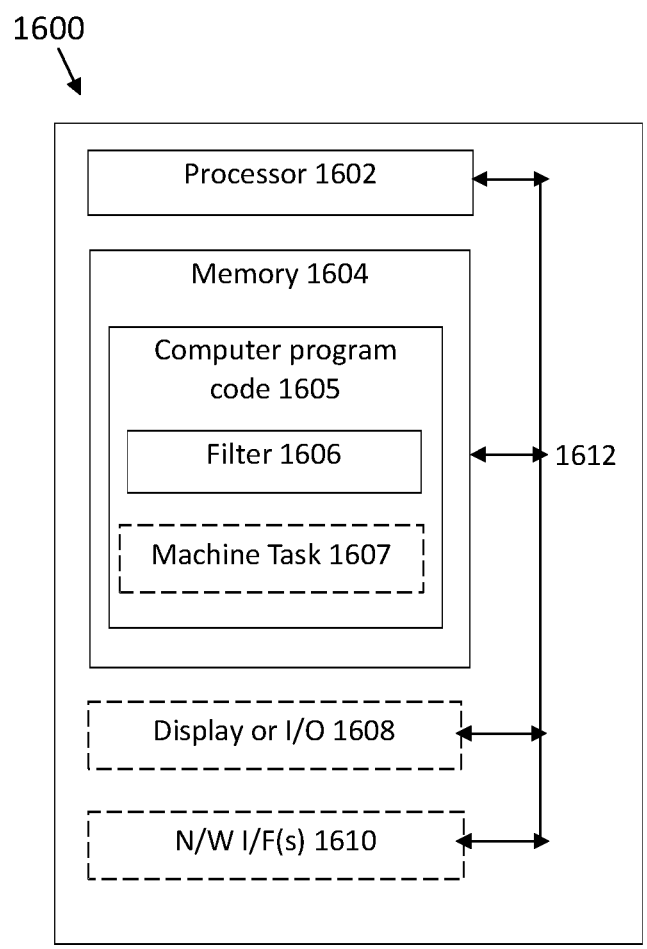
FIG. 16 is an example apparatus configured to implement a learned neural network based filter for at least one machine task, based on the examples described herein.

FIG. 16 is an example apparatus 1600, which may be implemented in hardware, configured to implement a learned filter for at least one machine task, based on the examples described herein. The apparatus 1600 comprises a processor 1602, at least one non-transitory or transitory memory 1604 including computer program code 1605, wherein the at least one memory 1604 and the computer program code 1605 are configured to, with the at least one processor 1602, cause the apparatus to implement a filter 1606 for at least one machine task 1607 (machine task 1607 is optionally included within the computer program code 1605 and apparatus 1600), based on the examples described herein. The apparatus 1600 optionally includes a display or I/O 1608 that may be used to display content during motion estimation, or receive user input from for example a keypad. The apparatus 1600 optionally includes one or more network (N/W) interfaces (I/F(s)) 1610. The N/W I/F (s) 1610 may be wired and/or wireless and communicate over the Internet/other network (s) via any communication technique. The N/W I/F (s) 1610 may comprise one or more transmitters and one or more receivers. The N/W I/F (s) 1610 may comprise standard well-known components such as an amplifier, filter, frequency-converter, (de) modulator, and encoder/decoder circuitry(ies) and one or more antennas. In some examples, the processor 1602 is configured to implement the filter 1606 or the machine task 1607 without use of memory 1604.

The memory 1604 may be implemented using any suitable data storage technology, such as semiconductor based memory devices, flash memory, magnetic memory devices and systems, optical memory devices and systems, fixed memory and removable memory. The memory 1604 may comprise a database for storing data. Interface 1612 enables data communication between the various items of apparatus 1600, as shown in FIG. 16. Interface 1612 may be one or more buses, or interface 1612 may be one or more software interfaces configured to pass data within computer program code 1605. For example, the interface 1612 may be an object-oriented interface in software, or the interface 1612 may be one or more buses such as address, data, or control buses, and may include any interconnection mechanism, such as a series of lines on a motherboard or integrated circuit, fiber optics or other optical communication equipment, and the like. The apparatus 1600 need not comprise each of the features mentioned, or may comprise other features as well. The apparatus 1600 may be an embodiment of any of the apparatuses shown in FIGS. 1 through 14, including any combination of those. The apparatus 1600 may be an encoder or decoder.

Figure 17:
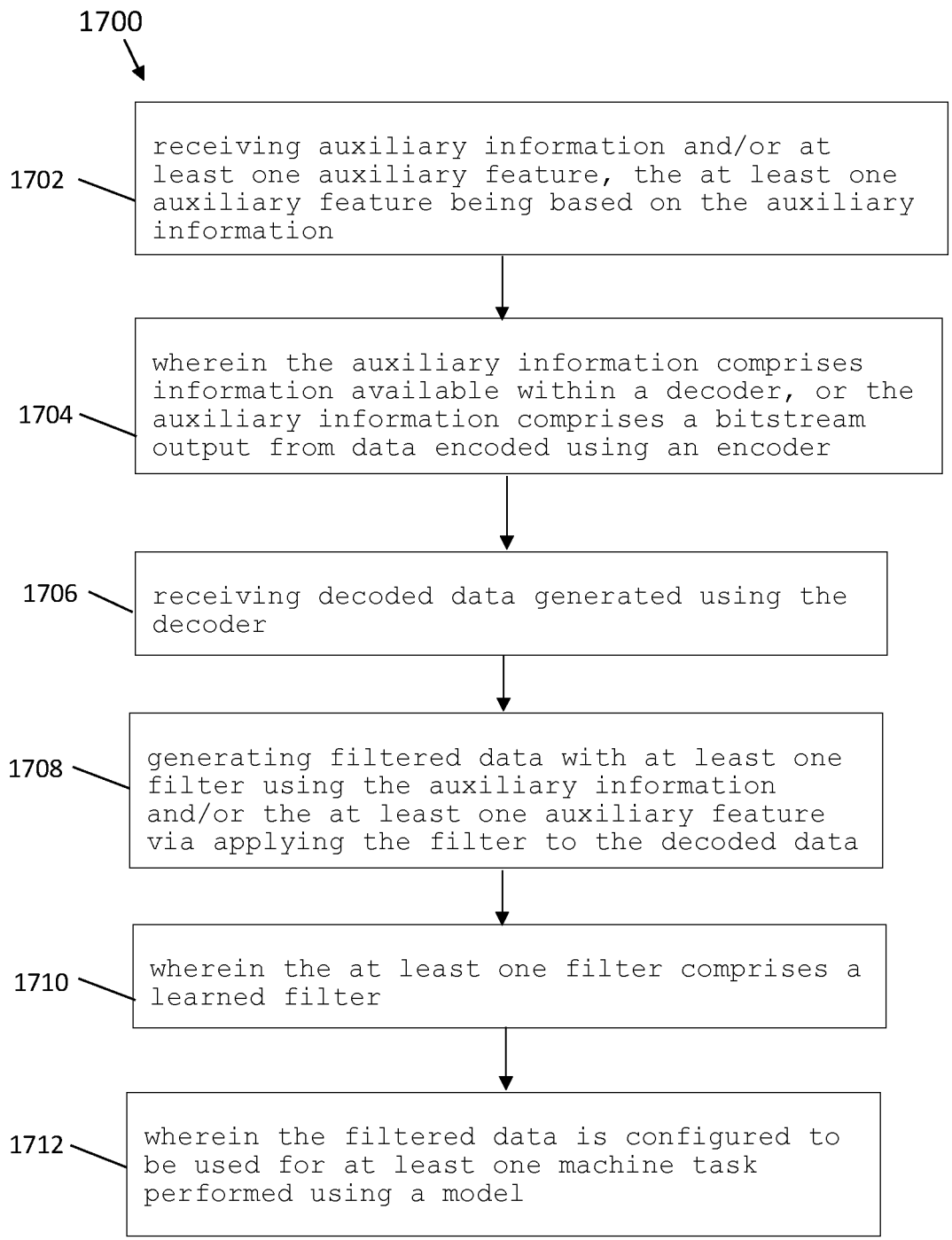
FIG. 17 is an example method to implement machine vision tasks via a learned neural network based filter, based on the examples described herein.

FIG. 17 is an example method 1700 to implement machine vision tasks via a learned filter, based on the examples described herein. At 1702, the method includes receiving auxiliary information and/or at least one auxiliary feature, the at least one auxiliary feature being based on the auxiliary information. At 1704, the method includes wherein the auxiliary information comprises information available within a decoder, or the auxiliary information comprises a bitstream output from data encoded using an encoder. At 1706, the method includes receiving decoded data generated using the decoder. At 1708, the method includes generating filtered data with at least one filter using the auxiliary information and/or the at least one auxiliary feature via applying the filter to the decoded data. At 1710, the method includes wherein the at least one filter comprises a learned filter. At 1712, the method includes wherein the filtered data is configured to be used for at least one machine task performed using a model. Method 1700 may be implemented with an encoder apparatus, a decoder apparatus, or a codec apparatus.

References to a 'computer', 'processor', etc. should be understood to encompass not only computers having different architectures such as single/multi-processor architectures and sequential/parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, etc.

As used herein, the term 'circuitry', 'circuit' and variants may refer to any of the following: (a) hardware circuit implementations, such as implementations in analog and/or digital circuitry, and (b) combinations of circuits and software (and/or firmware), such as (as applicable): (i) a combination of processor (s) or (ii) portions of processor (s)/software including digital signal processor (s), software, and memory (ies) that work together to cause an apparatus to perform various functions, and (c) circuits, such as a microprocessor (s) or a portion of a microprocessor (s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. Circuitry or circuit may also be used to mean a function or a process used to execute a method.

An example method includes receiving auxiliary information and/or at least one auxiliary feature, the at least one auxiliary feature being based on the auxiliary information; wherein the auxiliary information comprises information available within a decoder, or the auxiliary information comprises a bitstream output from data encoded using an encoder; receiving decoded data generated using the decoder; and generating filtered data with at least one filter using the auxiliary information and/or the at least one auxiliary feature via applying the filter to the decoded data; wherein the at least one filter comprises a learned filter; wherein the filtered data is configured to be used for at least one machine task performed using a model.

The method further may further include wherein the at least one filter is implemented with a neural network.

The method further may further include wherein the model comprises a neural network.

The method further may further include wherein: the decoder comprises a traditional video codec or a video codec that uses neural networks for some operations; and the encoder comprises the traditional video codec or the video codec that uses neural networks for some operations.

The method further may further include wherein the decoder comprises a learned decoder, and the encoder comprises a learned encoder.

The method further may further include generating the auxiliary feature using at least one processing operation that maps the auxiliary information to information suitable for generating the filtered data using the filter.

The method further may further include wherein the at least one processing operation comprises a neural network.

The method further may further include wherein the decoded data comprises a decoded image, and the filtered data comprises a filtered image.

The method further may further include providing the auxiliary information or the auxiliary feature as one or more inputs to the machine task.

The method further may further include generating the auxiliary feature based on an aggregation of a plurality of items of the auxiliary information provided over time.

The method further may further include wherein the auxiliary feature comprises a three-dimensional tensor with two spatial dimensions and one channel dimension, the three-dimensional tensor having a spatial resolution substantially the same as the decoded data or a downsampled or upsampled version of the decoded data, and channels of the auxiliary feature comprise the auxiliary information for pixels of an image.

The method further may further include wherein the at least one filter comprises a common filter and a dedicated filter, the method further comprising: in response to the machine task being known, generating the filtered data using the dedicated filter; in response to the machine task being unknown, generating the filtered data using the common filter; and wherein the common filter and the dedicated filter use different aspects of the auxiliary information or the at least one auxiliary feature.

The method further may further include wherein the information available within the decoder comprises block partitioning information of a corresponding image/video.

The method further may further include wherein the auxiliary feature is generated using the block partitioning information, and the auxiliary feature comprises a block partition map in image format.

The method further may further include wherein partition boundaries of the block partition map are marked in a binary image.

The method further may further include wherein the block partition map comprises an image generated via assigning pixels in a partition block to a value indicating the partition block.

The method further may further include wherein different blocks of the block partition map are labeled prior to using the block partition map in the at least one filter.

The method further may further include wherein: the auxiliary information comprises intra prediction information of blocks in frames of an image; or the auxiliary information comprises inter prediction information of blocks in frames of an image.

The method further may further include wherein the auxiliary information comprises motion vector information of inter predicted blocks of a frame of an image.

The method further may further include wherein the auxiliary information comprises scaled motion information or motion vectors, the motion information or motion vectors having been scaled based on a reference picture of the machine task.

The method further may further include wherein the auxiliary information comprises a transform of the information available within the decoder, or the auxiliary information comprises a transform of the bitstream output from the data encoded using the encoder, the transform being a discrete cosine transform, a discrete sine transform, or a low frequency non-separable transform.

The method further may further include wherein the auxiliary information comprises residual information of the decoder.

The method further may further include wherein the auxiliary information is derived from information related to one or more in-loop/post-processing filters of a video codec.

The method further may further include wherein the auxiliary information comprises pre-processing information from the encoder.

The method further may further include selecting the auxiliary information from a codec based on the machine task.

The method further may further include training the at least one filter using a subset of decoder-side information, such that a subset of the auxiliary information provides improvements to the machine task.

The method further may further include signaling a selection of the information available within a decoder to the decoder through at least one supplemental enhancement information message.

The method further may further include signaling from the encoder to the decoder whether or not to input the auxiliary information or the auxiliary feature to the filter.

The method further may further include signaling from the encoder to the decoder one or more parameters used to process the auxiliary information prior to inputting the auxiliary information or the auxiliary feature to the filter.

An example apparatus includes at least one processor; and at least one non-transitory memory including computer program code; wherein the at least one memory and the computer program code are configured to, with the at least one processor, cause the apparatus at least to: receive auxiliary information and/or at least one auxiliary feature, the at least one auxiliary feature being based on the auxiliary information; wherein the auxiliary information comprises information available within a decoder, or the auxiliary information comprises a bitstream output from data encoded using an encoder; receive decoded data generated using the decoder; and generate filtered data with at least one filter using the auxiliary information and/or the at least one auxiliary feature via applying the filter to the decoded data; wherein the at least one filter comprises a learned filter; wherein the filtered data is configured to be used for at least one machine task performed using a model.

An example apparatus includes means for receiving auxiliary information and/or at least one auxiliary feature, the at least one auxiliary feature being based on the auxiliary information; wherein the auxiliary information comprises information available within a decoder, or the auxiliary information comprises a bitstream output from data encoded using an encoder; means for receiving decoded data generated using the decoder; and means for generating filtered data with at least one filter using the auxiliary information and/or the at least one auxiliary feature via applying the filter to the decoded data; wherein the at least one filter comprises a learned filter; wherein the filtered data is configured to be used for at least one machine task performed using a model.

An example non-transitory program storage device readable by a machine, tangibly embodying a program of instructions executable with the machine for performing operations is provided, the operations comprising: receiving auxiliary information and/or at least one auxiliary feature, the at least one auxiliary feature being based on the auxiliary information; wherein the auxiliary information comprises information available within a decoder, or the auxiliary information comprises a bitstream output from data encoded using an encoder; receiving decoded data generated using the decoder; and generating filtered data with at least one filter using the auxiliary information and/or the at least one auxiliary feature via applying the filter to the decoded data; wherein the at least one filter comprises a learned filter; wherein the filtered data is configured to be used for at least one machine task performed using a model.

It should be understood that the foregoing description is only illustrative. Various alternatives and modifications may be devised by those skilled in the art. For example, features recited in the various dependent claims could be combined with each other in any suitable combination (s). In addition, features from different embodiments described above could be selectively combined into a new embodiment. Accordingly, the description is intended to embrace all such alternatives, modifications and variances which fall within the scope of the appended claims.

The following acronyms and abbreviations that may be found in the specification and/or the drawing figures are defined as follows:

3GPP 3rd generation partnership project
4G fourth generation of broadband cellular network technology
5G fifth generation cellular network technology
802.x family of IEEE standards dealing with local area networks and metropolitan area networks
ALF adaptive loop filter
AMVP advanced motion vector prediction
ASIC application specific integrated circuit
AVC advanced video coding
CCALF cross component adaptive loop filter
CDMA code-division multiple access
CRA clean random access
CTU coding tree unit
CU coding unit
DBF de-blocking filter
DCT discrete cosine transform
DSP digital signal processor
DST discrete sine transform
FDMA frequency division multiple access
FPGA field programmable gate array
GSM global system for mobile communications
H.222.0 MPEG-2 systems, standard for the generic coding of moving pictures and associated audio information
H. 2xx family of video coding standards in the domain of the ITU-T
HEVC high efficiency video coding IBC intra block copy
ID identifier
IDR instantaneous decoder refresh
IEC International Electrotechnical Commission
IEEE Institute of Electrical and Electronics Engineers
I/F interface
IMD integrated messaging device
IMS instant messaging service
I/O input/output
IoT internet of things
IP internet protocol
ISO International Organization for Standardization
ISOBMFF ISO base media file format
ITU International Telecommunication Union
ITU-T ITU Telecommunication Standardization Sector
JVET Joint Video Experts Team
LFNST low frequency non-separable transform
LTE long-term evolution
MC motion compensation
ME motion estimation
MMS multimedia messaging service
MPEG-2 H.222/H.262 as defined by the ITU, where MPEG is moving picture experts group
MSE mean squared error
MVD motion vector difference
NAL network abstraction layer net network
NN neural network
N/W network
PC personal computer
PDA personal digital assistant
PID packet identifier
PLC power line communication
pred prediction
PP post-processing
PU prediction unit
RADL random access decodable leading picture
RASL random access skipped leading picture
RFID radio frequency identification
RGB red green blue
RFM reference frame memory
SAO sample adaptive offset
SEI supplemental enhancement information
SMS short messaging service
TCP-IP transmission control protocol-internet protocol
TDMA time divisional multiple access
TS transport stream
TV television
UICC universal integrated circuit card
UMTS universal mobile telecommunications system
USB universal serial bus
VCM video coding for machines
VGG Visual Geometry Group of the University of Oxford
VSEI versatile supplemental enhancement information
VVC versatile video coding/codec
WLAN wireless local area network
YCbCr color space where Y is the luma component, Cb is the blue-difference chroma component, and Cr is the red-difference chroma component

What is claimed is:

1. An apparatus comprising:
at least one processor; and
at least one memory including computer program code;
wherein the at least one memory and the computer program code are configured to, with the at least one processor, cause the apparatus at least to:
receive auxiliary information and/or at least one auxiliary feature, the at least one auxiliary feature is based on the auxiliary information;
wherein the auxiliary information comprises information available within a decoder, or the auxiliary information comprises a bitstream output from data encoded using an encoder;
receive decoded data generated, wherein the decoded data comprises a decoded image; and
generate filtered data with at least one filter using the auxiliary information and/or the at least one auxiliary feature by applying the at least one filter to the decoded data, wherein the filtered data comprises a filtered image;
wherein the at least one filter comprises a learned filter;
wherein the filtered data is configured to be used for at least one machine task performed using a model;
wherein the at least one auxiliary feature comprises a three-dimensional tensor with two spatial dimensions and one channel dimension, the three-dimensional tensor comprising a spatial resolution that is substantially the same as a spatial resolution of the decoded data or a downsampled or upsampled version of the decoded data, and channels of the channel dimension of the at least one auxiliary feature comprise the auxiliary information for pixels of the decoded image.

2. The apparatus of claim 1, wherein the at least one filter is implemented with a neural network and wherein the model comprises the neural network.

3. The apparatus of claim 1, wherein the decoder comprises a learned decoder, and the encoder comprises a learned encoder.

4. The apparatus of claim 1, wherein the apparatus is further caused to generate the at least one auxiliary feature using at least one of the following:
at least one processing operation that maps the auxiliary information to information suitable for generating the filtered data using the filter, and wherein the at least one processing operation comprises a neural network; or
an aggregation of a plurality of items of the auxiliary information provided over time.

5. The apparatus of claim 1, wherein the apparatus is further caused to provide the auxiliary information or the at least one auxiliary feature as one or more inputs to the at least one machine task.

6. The apparatus of claim 1, wherein the at least one machine task that is performed using the model and the filtered data comprises at least one of: object detection, or object segmentation, or object tracking, or scene classification, or semantic segmentation, or video event detection, or anomaly detection, or pedestrian tracking.

7. The apparatus of claim 1, wherein the at least one filter comprises a common filter and a dedicated filter, the apparatus is further caused to:
in response to the machine task being known, generate the filtered data using the dedicated filter;
in response to the machine task being unknown, generate the filtered data using the common filter; and
wherein the common filter and the dedicated filter use different aspects of the auxiliary information or the at least one auxiliary feature.

8. The apparatus of claim 1, wherein the information available within the decoder comprises block partitioning information of a corresponding image or video.

9. The apparatus of claim 8, wherein the at least one auxiliary feature is generated using the block partitioning information, and the at least one auxiliary feature comprises a block partition map in an image format, wherein the block partition map is used to generate the filtered image by assigning pixels in a partition block to a value indicating the partition block.

10. The apparatus of claim 9, wherein different blocks of the block partition map are labeled prior to using the block partition map in the at least one filter.

11. The apparatus of claim 1, wherein the auxiliary information comprises at least one of the following:
   intra prediction information of blocks in frames of the image;
   inter prediction information of the blocks in frames of the image;
   motion vector information of inter predicted blocks of the frames of the image;
   scaled motion information or motion vectors, the scaled motion information or motion vectors having been scaled based on a reference picture of the machine task;
   a transform of information available within the decoder;
   a transform of the bitstream output from the data encoded using the encoder, the transform comprises a discrete cosine transform, a discrete sine transform, or a low frequency non-separable transform;
   residual information of the decoder; or
   pre-processing information from the encoder.

12. The apparatus of claim 1, wherein the auxiliary information is derived from information related to one or more in-loop/post-processing filters of a video codec.

13. The apparatus of claim 1, wherein the apparatus is further caused to select the auxiliary information from a codec based on the machine task.

14. The apparatus of claim 1, wherein the apparatus is caused to train the at least one filter using a subset of decoder-side information, such that a subset of the auxiliary information provides improvements to the machine task.

15. The apparatus of claim 1, wherein the apparatus is further caused to signal a selection of the information available within the decoder to the decoder through at least one supplemental enhancement information message.

16. The apparatus of claim 1, wherein the apparatus is further caused to signal from the encoder to the decoder at least one of the following:
   whether or not to input the auxiliary information or the auxiliary feature to the filter; or
   one or more parameters used to process the auxiliary information prior to inputting the auxiliary information or the auxiliary feature to the filter.

17. A method comprising:
   receiving auxiliary information and/or at least one auxiliary feature, the at least one auxiliary feature is based on the auxiliary information;
   wherein the auxiliary information comprises information available within a decoder, or the auxiliary information comprises a bitstream output from data encoded using an encoder;
   receiving decoded data generated using the decoder; and
   generating filtered data with at least one filter using the auxiliary information and/or the at least one auxiliary feature by applying the at least one filter to the decoded data;
   wherein the filtered data is configured to be used for at least one machine task performed using a model;
   wherein the at least one auxiliary feature comprises a three-dimensional tensor with two spatial dimensions and one channel dimension, the three-dimensional tensor comprising a spatial resolution that is substantially the same as a spatial resolution of the decoded data or a downsampled or upsampled version of the decoded data, and channels of the channel dimension of the at least one auxiliary feature comprise the auxiliary information for pixels of the decoded image.

18. The method of claim 17, wherein the at least one filter is implemented with a neural network and wherein the model comprises the neural network.

19. The method of claim 17, further comprising generating the at least one auxiliary feature using at least one of the following:
   at least one processing operation that maps the auxiliary information to information suitable for generating the filtered data using the filter, and wherein the at least one processing operation comprises a neural network; or
   an aggregation of a plurality of items of the auxiliary information provided over time.

20. A non-transitory program storage device readable by a machine, tangibly embodying a program of instructions executable with the machine for performing operations, the operations comprising:
   receiving auxiliary information and/or at least one auxiliary feature, the at least one auxiliary feature being based on the at least one auxiliary information;
   wherein the auxiliary information comprises information available within a decoder, or the auxiliary information comprises a bitstream output from data encoded using an encoder;
   receiving decoded data generated using the decoder; and
   generating filtered data with at least one filter using the auxiliary information and/or the at least one auxiliary feature via applying the at least one filter to the decoded data;
   wherein the at least one filter comprises a learned filter;
   wherein the filtered data is configured to be used for at least one machine task performed using a model;
   wherein the information available within the decoder comprises block partitioning information of a corresponding image or video;
   wherein the at least one auxiliary feature is generated using the block partitioning information, and the at least one auxiliary feature comprises a block partition map in an image format, wherein the block partition map is used to generate the filtered image by assigning pixels in a partition block to a value indicating the partition block.

* * * * *